US009616659B2

United States Patent
Morikawa

(10) Patent No.: US 9,616,659 B2
(45) Date of Patent: Apr. 11, 2017

(54) IMAGE PROCESSING APPARATUS THAT DETERMINES EJECTION EXECUTION DIRECTION OF PRINT HEAD

(71) Applicant: Brother Kogyo Kabushiki Kaisha, Nagoya-shi, Aichi-ken (JP)

(72) Inventor: Shota Morikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/086,923

(22) Filed: Mar. 31, 2016

(65) Prior Publication Data

US 2017/0050431 A1    Feb. 23, 2017

(30) Foreign Application Priority Data

Aug. 17, 2015 (JP) .................................. 2015-160281

(51) Int. Cl.
*B41J 2/045* (2006.01)
(52) U.S. Cl.
CPC ....... *B41J 2/04536* (2013.01); *B41J 2/04586* (2013.01); *B41J 2/04543* (2013.01); *B41J 2/04545* (2013.01)
(58) Field of Classification Search
None
See application file for complete search history.

(56) References Cited

U.S. PATENT DOCUMENTS

| 8,714,679 B2 | 5/2014 | Kuno | |
|---|---|---|---|
| 8,823,983 B2 * | 9/2014 | Yamada | G06F 3/1212 358/1.14 |
| 2006/0181562 A1 * | 8/2006 | Hirano | H04N 1/6027 347/15 |

(Continued)

FOREIGN PATENT DOCUMENTS

| JP | 2012-171143 A | 9/2012 |
|---|---|---|
| JP | 2015-054484 A | 3/2015 |

OTHER PUBLICATIONS

Co-Pending U.S. Appl. No. 15/087,167, filed Mar. 31, 2016.
Nov. 18, 2016—(US) Notice of Allowance—U.S. Appl. No. 15/087,167.

*Primary Examiner* — Lisa M Solomon
(74) *Attorney, Agent, or Firm* — Banner & Witcoff, Ltd.

(57) ABSTRACT

An image processing apparatus includes a controller for controlling a print execution unit. The print execution unit repeatedly performs ejection processing of ejecting a droplet of color material onto a printing medium. The controller is configured to perform: specifying an estimate value for a target partial image by using color gap information, the target partial image being selected among a plurality of partial images included in an N-th band image; determining whether the estimate value satisfies an estimate condition; determining an ejection execution direction with respect to an N-th ejection processing to be a first direction in response to determination that the estimate value satisfies the estimate condition; and determining the ejection execution direction (Continued)

with respect to the N-th ejection processing to be opposite to the ejection execution direction with respect to an (N−1)-th ejection processing in response to determination that the estimate value does not satisfy the estimate condition.

13 Claims, 14 Drawing Sheets

(56) References Cited

U.S. PATENT DOCUMENTS

2012/0213569 A1    8/2012  Kuno
2015/0286905 A1*  10/2015  Kikuta ............... G06K 15/1881
                                               358/1.8

* cited by examiner

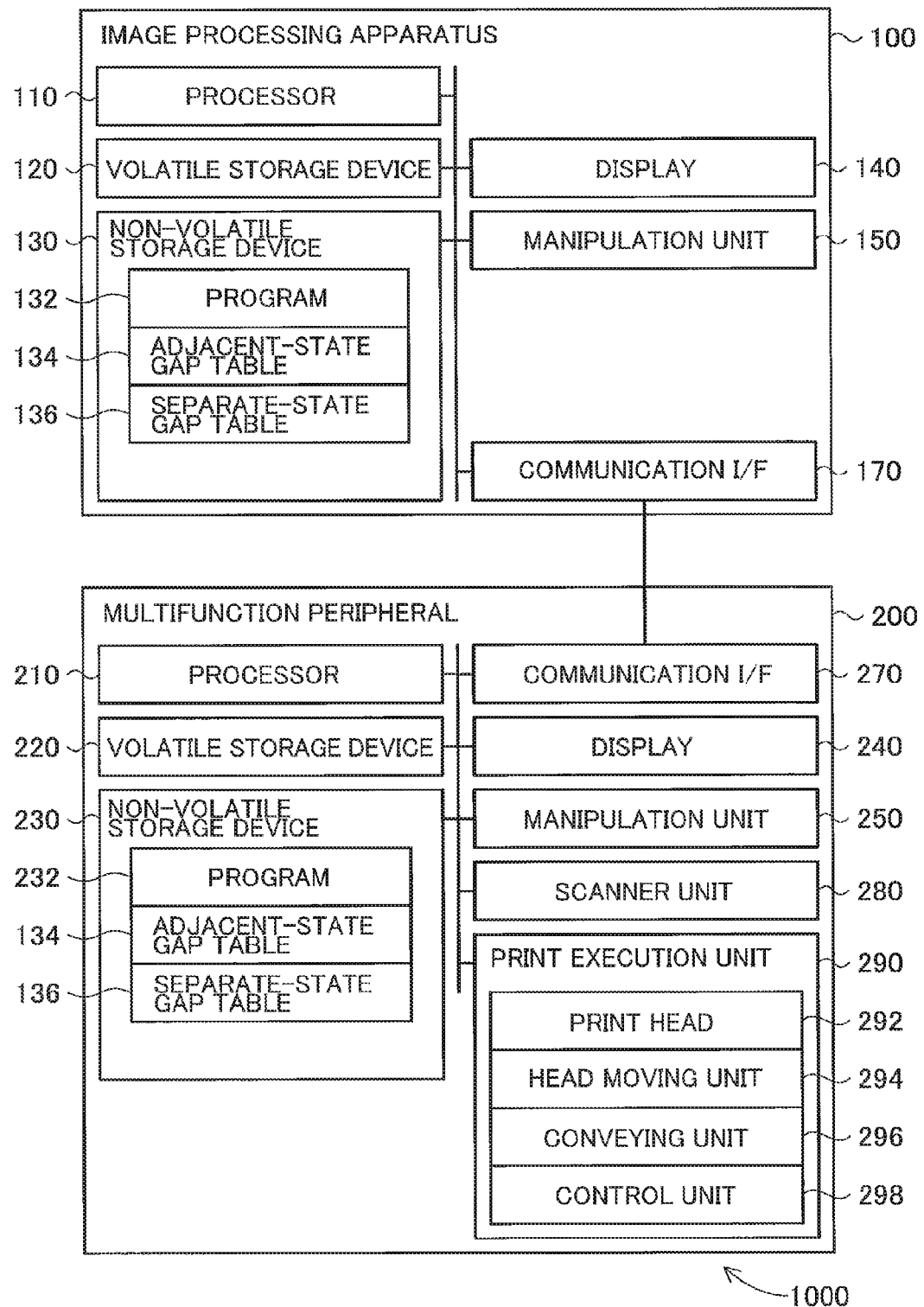

FIG. 5
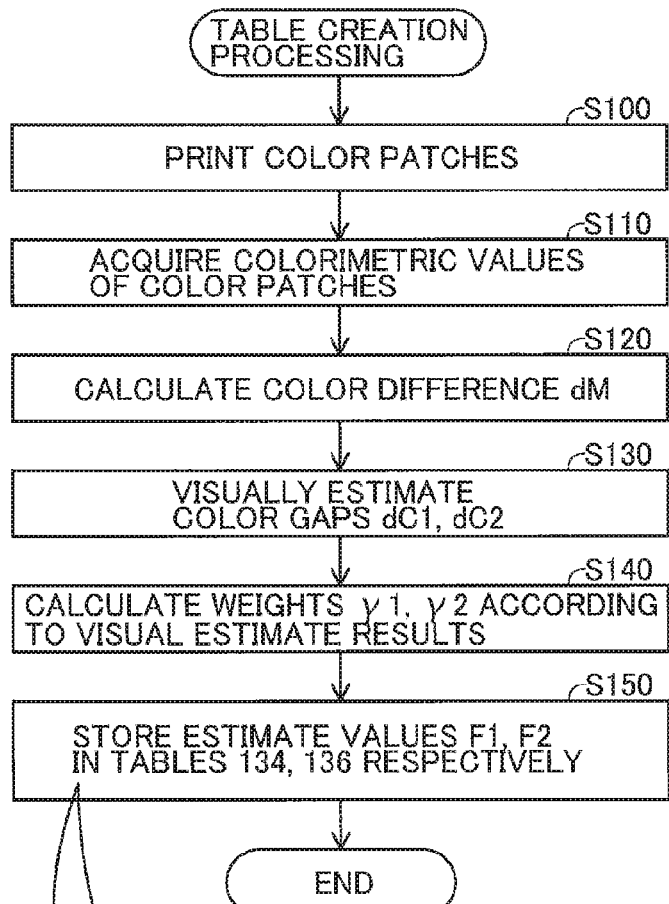
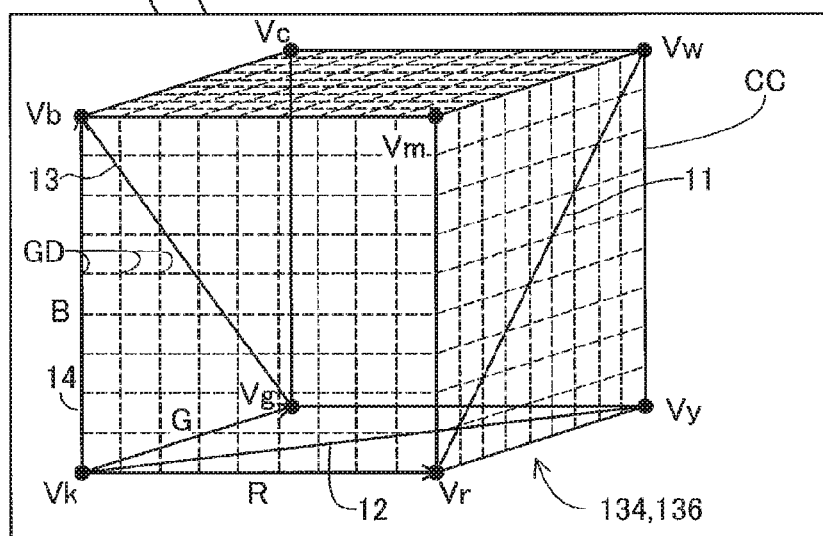

FIG. 6A
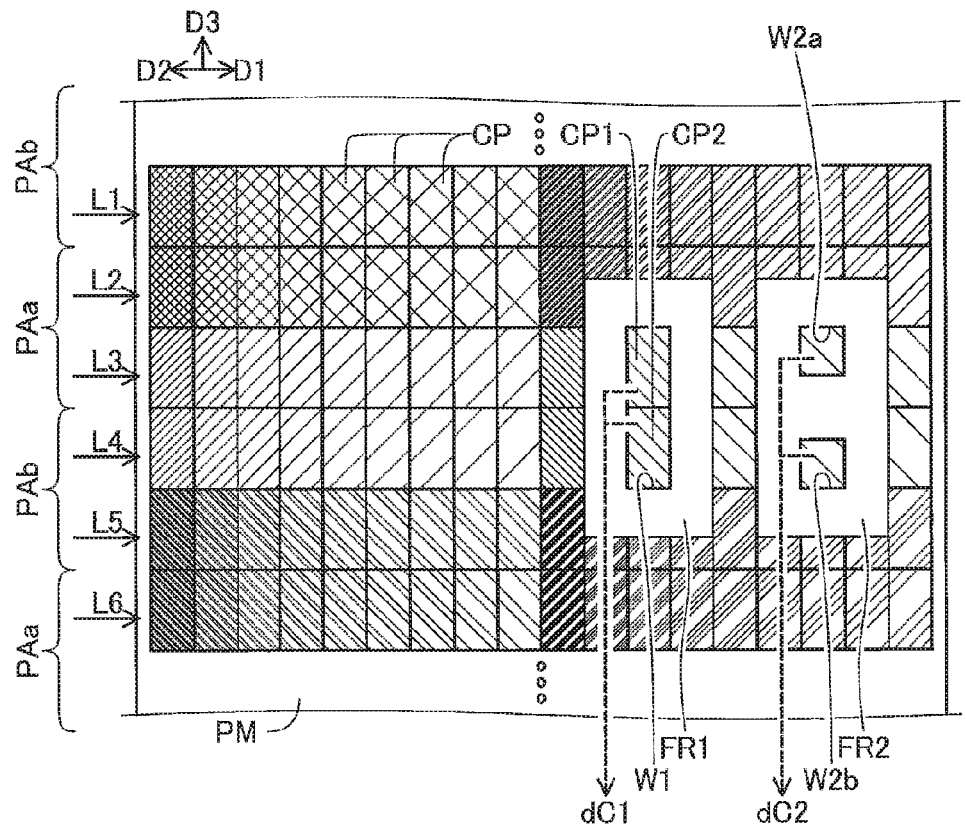
FIG. 6B
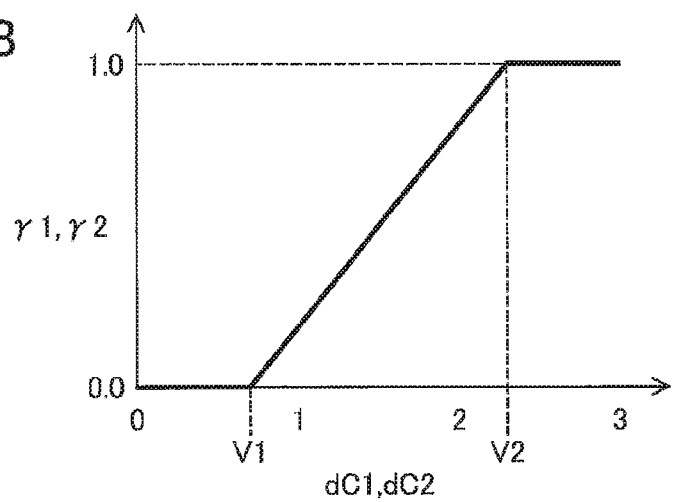
FIG. 6C
$$F1(R,G,B) = dM(R,G,B) \times \gamma 1(R,G,B)$$
$$F2(R,G,B) = dM(R,G,B) \times \gamma 2(R,G,B)$$
⇔ Th

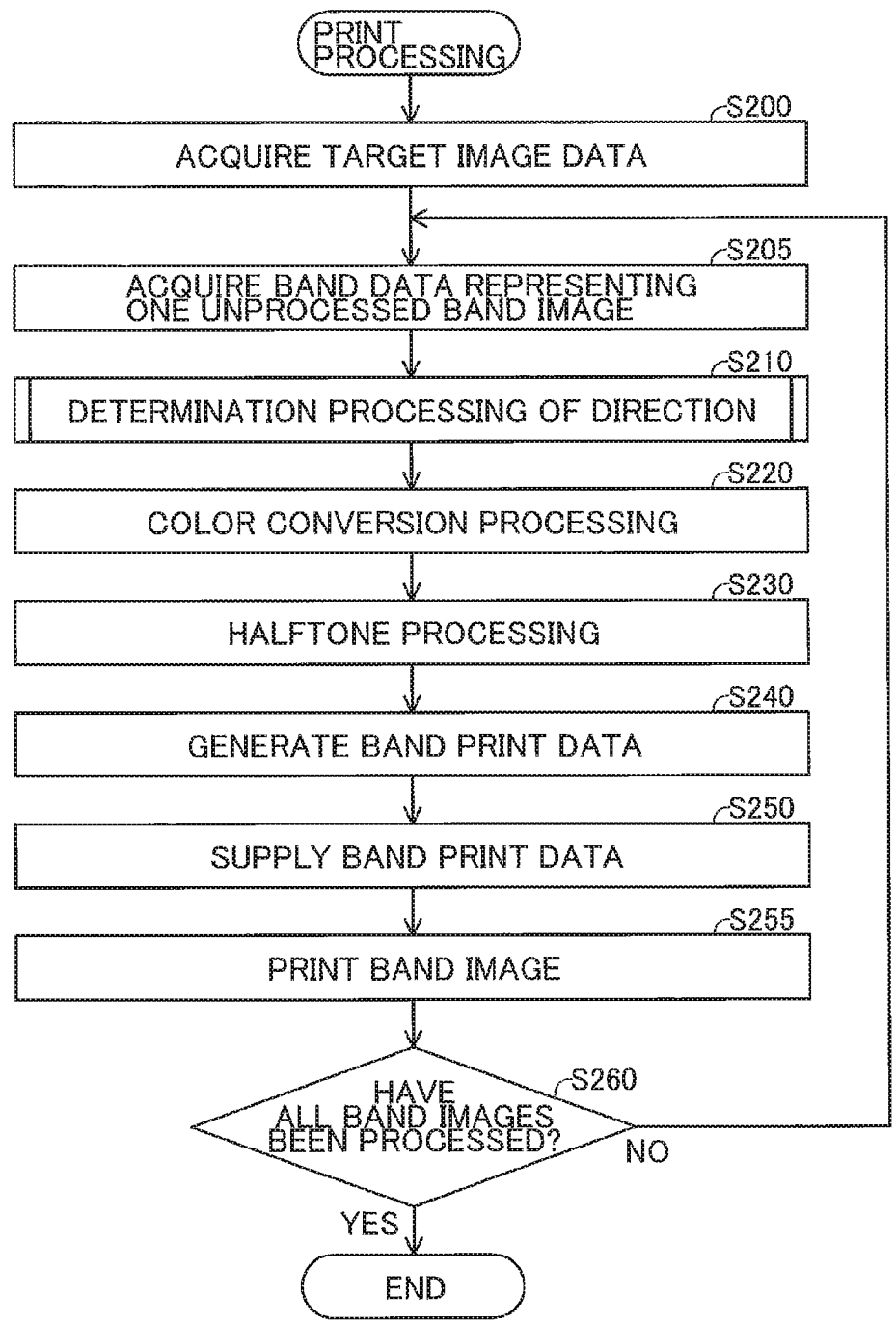

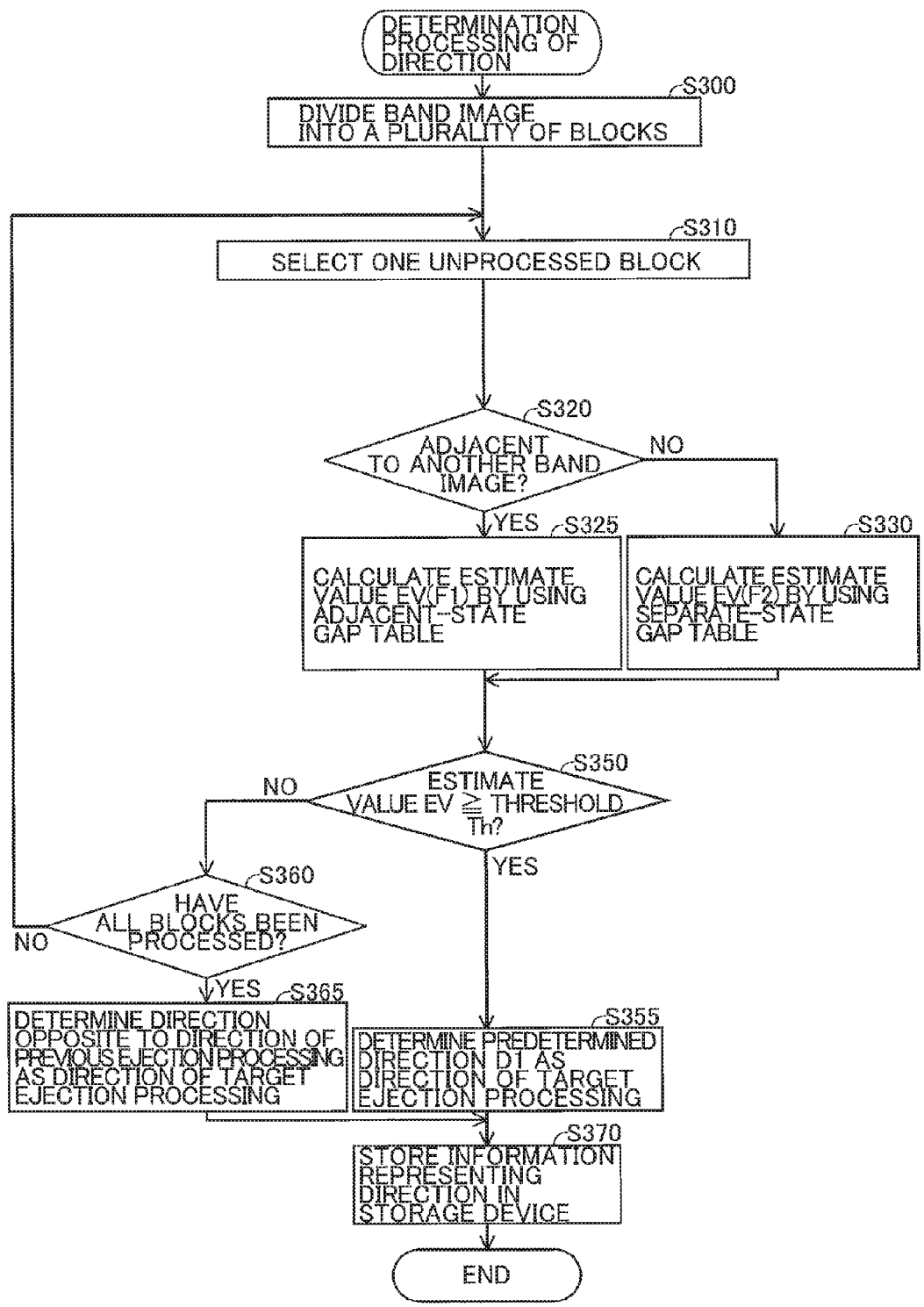

FIG. 14A $$F1(R,G,B) = dM(R,G,B) \times \gamma 1(R,G,B)$$
$$F2(R,G,B) = dM(R,G,B) \times \gamma 2(R,G,B)$$
$$\Longleftrightarrow \begin{cases} Tht \\ Thn \end{cases}$$

$$(Tht > Thn)$$

FIG. 14B $$F1w(R,G,B) = dM(R,G,B) \times \gamma 1(R,G,B)$$
$$F2w(R,G,B) = dM(R,G,B) \times \gamma 2(R,G,B)$$
$$\begin{cases} \times \varepsilon t \\ \times \varepsilon n \end{cases} \Longleftrightarrow Th$$

$$(\varepsilon t < \varepsilon n)$$

ND DETERMINES EJECTION EXECUTION DIRECTION OF PRINT HEAD

IMAGE PROCESSING APPARATUS THAT DETERMINES EJECTION EXECUTION DIRECTION OF PRINT HEAD

CROSS REFERENCE TO RELATED APPLICATION

This application claims priority from Japanese Patent Application No. 2015-160281 filed on Aug. 17, 2015. The entire content of the priority application is incorporated herein by reference. The present application is closely related to a co-pending U.S. Patent Application corresponding to Japanese Patent Application No. 2015-160282 filed on Aug. 17, 2015.

TECHNICAL FIELD

The present disclosure relates to technology that makes a print execution unit execute image printing.

BACKGROUND

An inkjet type printer known in the art has a print head provided with a plurality of nozzle groups corresponding to inks of a plurality of colors and prints a color image by ejecting ink droplets of a plurality of colors onto a printing medium from the nozzle groups while scanning in a main scanning direction. This type of printer can print an image corresponding to a band-like unit printing region (band region) having the same width as a nozzle width (length of a nozzle group) in one scan of the print head. In order to print an image onto a printing region having a larger size than one band region, print of the image of the unit band region is repeated while shifting a position of the printing medium in a sub-scanning direction. Further, printing speed can be improved by executing bidirectional printing in which printing is performed by means of both a main scanning operation of the print head in a first direction and main scanning operation thereof in a second direction as compared to unidirectional printing in which printing is performed by means of a main scanning operation in only one direction.

Even though it is intended to express the same color, a difference in a printing direction can express different colors. Specifically, different colors can be expressed between first-direction main scanning operation and second-direction main scanning operation. That is, the difference in the printing direction changes an ink overlapping order, with the result that the observed color may differ among observers. In order to reduce a possibility of occurrence of this phenomenon, there is proposed a technique that calculates an index value concerning an estimated ink amount for each of a plurality of blocks in the band region and determines a specific one direction as the scanning direction when the index value is more than a threshold value. The above-mentioned phenomenon is recognizable at a boundary of the band region, so that there is proposed a technique that uses, as a threshold for a boundary block positioned near the boundary of the band region, a value less than a threshold for an internal block positioned separated from the boundary of the band region.

SUMMARY

However, a difference in the recognizability of the above-mentioned phenomenon generated depending on whether a printing portion in the band region is adjacent to or separate from another band region has not sufficiently been considered.

In view of the foregoing, it is an object of the disclosure to provide technology that can determine a moving direction of the print head by adequately considering that recognizability of the above-mentioned phenomenon differs in accordance with a position in the band region when the same color is printed by overlapping inks of a plurality of colors in a different order.

In order to attain the above and other objects, one aspect provides an image processing apparatus for controlling a print execution unit. The print execution unit includes a print head. The print head has a plurality of nozzle groups. The plurality of nozzle groups corresponds to a plurality of color material and is arranged in a main scanning direction. Each of the plurality of nozzle groups includes a plurality of nozzles. The plurality of nozzles is arranged in a sub-scanning direction. Each of the plurality of nozzles is configured to eject a droplet of color material onto a printing medium. The image processing apparatus includes a controller. The controller is configured to perform: acquiring image data; determining an ejection execution direction of the print head for each of a plurality of pieces of band image data, the image data including the plurality of pieces of band image data representing a plurality of band images arranged in the sub-scanning direction, the ejection execution direction being one of a first direction and a second direction, the first direction being parallel to the main scanning direction, the second direction being parallel to the main scanning direction and opposite to the first direction; and controlling the print execution unit to form an image according to the image data, the print execution unit repeatedly performing an ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed. The controller is further configured to perform: specifying an estimate value for a target partial image by using color gap information, the target partial image being selected among a plurality of partial images included in the N-th band image, the color gap information including adjacent-state color gap information and separate-state color gap information, the adjacent-state color gap information being relevant to a color gap perceived when a first printed image and a second printed image are disposed adjacent to each other, the first printed image having a pixel value and being printed by moving the print head in the first direction, the second printed image having the pixel value same as the first printed image and being printed by moving the print head in the second direction, the separate-state color gap information being relevant to a color gap perceived when the first printed image and the second printed image are separated from each other, the adjacent-state color gap information being used in response to determination that the target partial image is adjacent to another band image different from the N-th band image, the separate-state color gap information being used in response to determination that the target partial image is not adjacent to another band image different from the N-th band image; determining whether the estimate value satisfies an estimate condition, the estimate condition indicating that a color gap between the first printed image and the second printed image is recognizable; determining the ejection execution direction with respect to the N-th ejection processing to be the first direction in response to determination that the estimate value satisfies the estimate condition; and determining the ejection execution direction with respect to the N-th ejection processing to be opposite to the ejection execution direction with respect to the (N−1)-th ejection processing in response to determination that the estimate value does not satisfy the estimate condition, where N is an integer equal to or greater than 2.

According to another aspect, another aspect provides a non-transitory computer readable storage medium storing a set of program instructions installed on and executed by a controller. The program instructions, when executed by the controller, cause the controller to control a print execution unit to perform image forming. The print execution unit includes a print head. The print head has a plurality of nozzle groups. The plurality of nozzle groups corresponds to a plurality of color material and is arranged in a main scanning direction. Each of the plurality of nozzle groups includes a plurality of nozzles. The plurality of nozzles is arranged in a sub-scanning direction. Each of the plurality of nozzles is configured to eject a droplet of color material onto a printing medium. The controller is configured to control an image processing apparatus to perform: acquiring image data; determining an ejection execution direction of the print head for each of a plurality of pieces of band image data, the image data including the plurality of pieces of band image data representing a plurality of band images arranged in the sub-scanning direction, the ejection execution direction being one of a first direction and a second direction, the first direction being parallel to the main scanning direction, the second direction being parallel to the main scanning direction and opposite to the first direction; and controlling the print execution unit to form an image according to the image data, the print execution unit repeatedly performing an ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed. The program instructions further includes controlling the image processing apparatus to perform: specifying an estimate value for a target partial image by using color gap information, the target partial image being selected among a plurality of partial images included in the N-th band image, the color gap information including adjacent-state color gap information and separate-state color gap information, the adjacent-state color gap information being relevant to a color gap perceived when a first printed image and a second printed image are disposed adjacent to each other, the first printed image having a pixel value and being printed by moving the print head in the first direction, the second printed image having the pixel value same as the first printed image and being printed by moving the print head in the second direction, the separate-state color gap information being relevant to a color gap perceived when the first printed image and the second printed image are separated from each other, the adjacent-state color gap information being used in response to determination that the target partial image is adjacent to another band image different from the N-th band image, the separate-state color difference information being used in response to determination that the target partial image is not adjacent to another band image different from the N-th band image; determining whether the estimate value satisfies an estimate condition, the estimate condition indicating that a color gap between the first printed image and the second printed image is recognizable; determining the ejection execution direction with respect to the N-th ejection processing to be the first direction in response to determination that the estimate value satisfies the estimate condition; and determining the ejection execution direction with respect to the N-th ejection processing to be opposite to the ejection execution direction with respect to the (N−1)-th ejection processing in response to determination that the estimate value does not satisfy the estimate condition, where N is an integer equal to or greater than 2.

BRIEF DESCRIPTION OF THE DRAWINGS

The particular features and advantages of the disclosure as well as other objects will become apparent from the following description taken in connection with the accompanying drawings, in which:

FIG. 1 is an explanatory view illustrating an image processing system of an embodiment of the present disclosure;

FIGS. 3A, 3B, and 3C are graphs each illustrating an example of a range of a color exhibiting a large difference in color due to a difference in ink overlapping order, in which:

FIG. 3A illustrates a graph in which a color range is projected to a*b* plane,

FIG. 3B illustrates a graph in which the color range is projected to a*L* plane, and FIG. 3C illustrates a graph in which the color range is projected to b*L* plane;

FIGS. 4A, 4B, 4C, and 4D are explanatory views of a gap in color perceived by an observer when two partial images are observed visually, in which:

FIG. 4A illustrates two color patches arranged up and down and perceptual gaps,

FIG. 4B illustrates a graph in which a color range is projected to a*b* plane,

FIG. 4C illustrates a graph in which the color range is projected to a*L* plane, and FIG. 4D illustrates a graph in which the color range is projected to b*L* plane;

FIG. 5 is a flowchart illustrating steps in creation processing of an adjacent-state gap table and a separate-state gap table;

FIG. 6A is an explanatory view illustrating an example of a plurality of color patches printed on a sheet;

FIG. 6B is a graph illustrating a correspondence between perceptual gaps and weights;

FIG. 6C is a view illustrating an example of calculation expressions of respective estimate values;

FIG. 7 is a flowchart illustrating steps in print processing;

FIG. 8 is a flowchart illustrating steps in determination processing of a direction of ejection processing in a first embodiment;

FIG. 14A is a view schematically illustrating calculation expressions of respective estimate values and thresholds in the second embodiment; and FIG. 14B is a view schematically illustrating calculation expressions of respective estimate values and thresholds in modification.

DETAILED DESCRIPTION

A. First Embodiment

Figure 2A:
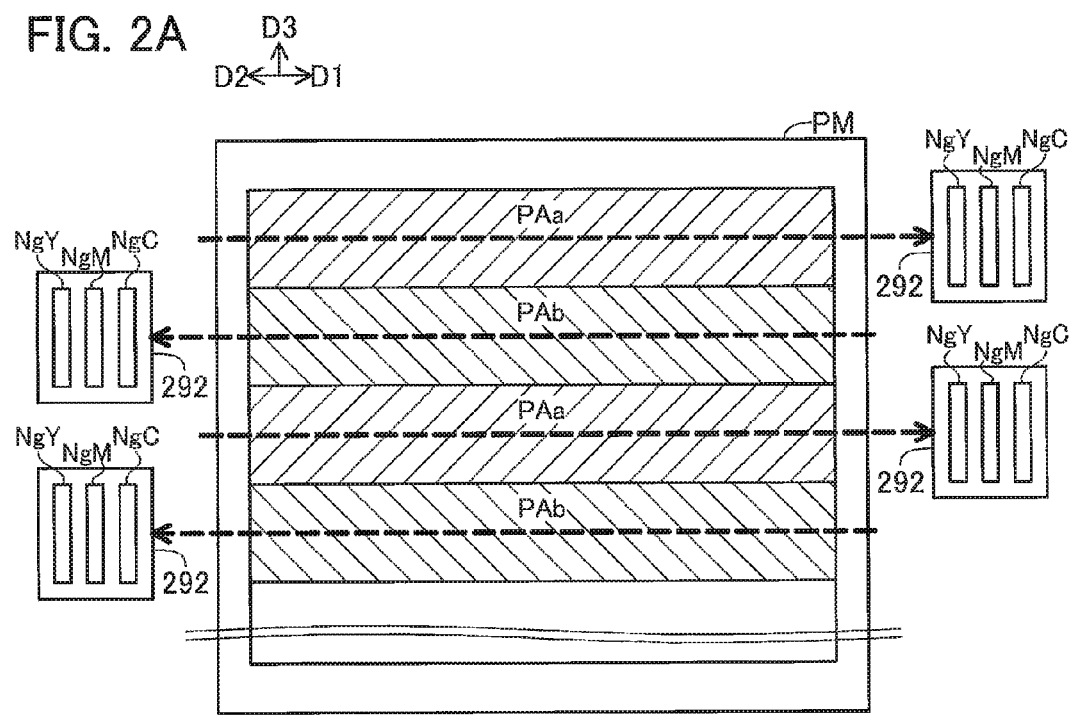
FIG. 2A is an explanatory view illustrating band regions on a sheet and moving directions of a print head.

FIG. 1 is an explanatory view illustrating an image processing system 1000 of an embodiment of the present disclosure. The image processing system 1000 includes an image processing apparatus 100 and a multifunction peripheral 200 connected to the image processing apparatus 100. As described later, the multifunction peripheral 200 has a print execution unit 290 that executes image printing.

The image processing apparatus 100 is a personal computer (desktop computer, tablet computer, etc.). The image processing apparatus 100 includes a processor 110, a volatile storage device 120, a non-volatile storage device 130, a display 140 that displays an image, a manipulation unit 150 that receives user manipulation, and a communication interface 170. These components are connected to one another through a bus.

The processor 110 (example of the claimed controller) is a device for data processing and is, e.g., a central processing unit (CPU). The volatile storage device 120 is, e.g., a dynamic random access memory (DRAM), and the non-volatile storage device 130 is, e.g., a flash memory.

The non-volatile storage device 130 stores a program 132 and two lookup tables 134 and 136. The processor 110 executes the program 132 to realize various functions. Functions realized by the program 132 and configurations of the lookup tables 134 and 136 (hereinafter, referred to also merely as "tables 134 and 136") will be described later in detail. The processor 110 temporarily stores various intermediate data used for execution of the program 132 in the storage device (any one of the volatile storage device 120 and the non-volatile storage device 130). In the present embodiment, the program 132 and the tables 134 and 136 are included in a device driver provided by a manufacturer of the multifunction peripheral 200.

The display 140 is a device that displays an image and is, e.g., a liquid crystal display. The manipulation unit 150 is a device that receives user manipulation and is, e.g., a touch panel disposed so as to be overlapped on the display 140. A user can input various commands to the image processing apparatus 100 by manipulating the manipulation unit 150.

The communication interface 170 is an interface for communication with another device and is, e.g., a USB interface, a wired LAN interface, an IEEE802.11 wireless interface. The communication interface 170 is connected with the multifunction peripheral 200.

The image processing apparatus 100 drives the multifunction peripheral 200 according to an instruction from a user and makes the multifunction peripheral 200 execute image printing.

The multifunction peripheral 200 includes a processor 210, a volatile storage device 220, a non-volatile storage device 230, a display 240 that displays an image, a manipulation unit 250 that receives user manipulation, a communication interface 270, a scanner unit 280, and a print execution unit 290. These components are connected to one another through a bus.

The processor 210 is a device for data processing and is, e.g., a CPU. The volatile storage device 220 is, e.g., a DRAM, and the non-volatile storage device 230 is, e.g., a flash memory.

The non-volatile storage device 230 stores a program 232 and two lookup tables 134 and 136. The processor 210 executes the program 232 to realize various functions (details thereof will be described later). The processor 210 temporarily stores various intermediate data used for execution of the program 232 in the storage device (any one of the volatile storage device 220 and the non-volatile storage device 230). The two tables 134 and 136 stored in the non-volatile storage device 230 of the multifunction peripheral 200 are the same as the tables 134 and 136 stored in the non-volatile storage device 130 of the image processing apparatus 100. In the present embodiment, the program 232 and the tables 134 and 136 are previously stored, as firmware, in the non-volatile storage device 230 by a manufacturer of the multifunction peripheral 200.

The display 240 is a device that displays an image and is, e.g., a liquid crystal display. The manipulation unit 250 is a device that receives user manipulation and is, e.g., a touch panel disposed so as to be overlapped on the display 240. A user can input various commands to the multifunction peripheral 200 by manipulating the manipulation unit 250.

The communication interface 270 is an interface for communication with another device. The communication interface 270 is connected to the communication interface 170 of the image processing apparatus 100.

The scanner unit 280 optically reads an object such as an original using a photoelectric conversion element, such as a charge-coupled device (CCD) or a complementary metal oxide semiconductor (CMOS), to generate scan data representing a read image (referred to as "scan image"). The scan data is, e.g., RGB bitmap data representing a color scan image.

The print execution unit 290 is a device that prints an image on a sheet (example of a printing medium). In the present embodiment, the print execution unit 290 includes a print head 292, a head moving unit 294, a conveying unit 296, and a control unit 298 that controls the print head 292, the head moving unit 294, and the conveying unit 296. Although details will be described later, the print execution unit 290 is an inkjet type printer that uses inks of colors of cyan C, magenta M, and yellow Y. A combination of the inks that can be used is not limited to the CMY, but various combinations (e.g., CMYK (cyan C, magenta M, yellow Y, and black K)) may be adopted.

The multifunction peripheral 200 can make the print execution unit 290 execute image printing by using print data supplied from another device (e.g., the image processing apparatus 100). Further, the multifunction peripheral 200 drives the scanner unit 280 according to an instruction from a user to optically read an object to thereby generate scan data representing the object. The multifunction peripheral 200 can make the print execution unit 290 print an image represented by the scan data.

FIG. 2A is an explanatory view illustrating band regions PAa and PAb on a sheet PM and moving directions of the print head 292. A first direction D1 and a second direction D2 illustrated in FIG. 2A denote a main scanning direction (the second direction D2 is an opposite direction to the first direction D1). The head moving unit 294 (FIG. 1) is a device that reciprocates the print head 292 in parallel to the main scanning direction. Although not illustrated, the head moving unit 294 includes a rail that supports the print head 292 so as to allow the same to be slidable in the main scanning direction, a plurality of pulleys, a belt wound around the pulleys and partly fixed to the print head 292, and a motor that rotates the pulleys. When the motor rotates the pulleys, the print head 292 is moved in the main scanning direction.

A third direction D3 illustrated in FIG. 2A denotes a sub-scanning direction (hereinafter, referred to also as "sub-scanning direction D3"). The conveying unit 296 (FIG. 1) is a device that conveys the sheet PM to the print head 292 in the sub-scanning direction D3. Although not illustrated, the conveying unit 296 includes a table that supports the sheet PM at a position opposite to the print head 292, an upstream roller disposed upstream of the print head 292, a downstream roller disposed downstream of the print head 292, and a motor that rotates the rollers. The sheet PM is conveyed in the sub-scanning direction D3 by the rollers. In the present embodiment, the sub-scanning direction D3 is a direction perpendicular to the main scanning directions D1 and D2.

Figure 2B:
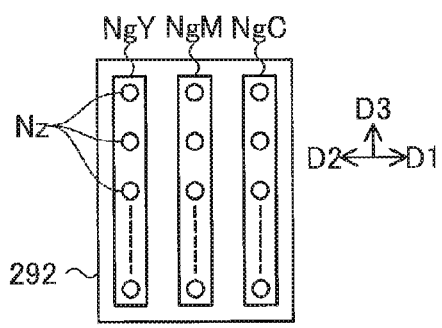
FIG. 2B is an explanatory view illustrating a nozzle arrangement in a bottom surface of the print head.

FIG. 2B is an explanatory view illustrating a nozzle arrangement in a bottom surface of the print head 292. As illustrated, there are formed, in the bottom surface of the print head 292, a nozzle group NgC for ejecting ink of cyan C, a nozzle group NgM for ejecting ink of magenta M, and a nozzle group NgY for ejecting ink of yellow Y. Positions of a plurality of nozzles Nz of one nozzle group in the sub-scanning direction D3 are different from each other. In the present embodiment, the plurality of nozzles Nz of one nozzle group is arranged along the sub-scanning direction D3. A position in the main scanning direction is the same among the plurality of nozzles Nz of one nozzle group. However, the position in the main scanning direction may differ between at least a part of nozzles Nz and the other nozzles Nz. Further, the three nozzle groups NgC, NgM, NgY are arranged along the main scanning direction (here, the second direction D2) in the mentioned order.

As illustrated in FIG. 2A, the print execution unit 290 (FIG. 1) ejects ink droplets from the plurality of nozzles Nz of the plurality of nozzle groups NgC, NgM, and NgY to the sheet PM while moving the print head 292 in the main scanning direction to thereby print an image on the band-like regions PAa and PAb on the sheet PM that extend in the main scanning direction. Then, the print execution unit 290 conveys the sheet PM in the sub-scanning direction D3 in response to completion of printing of a part of an image of a printing object, more specifically, a band image which is an image corresponding to one band region PAa or PAb. A conveying amount corresponds to a width of one band region PAa or PAb in the sub-scanning direction D3 (i.e., a width of one band image). The print execution unit 290 alternately repeats printing of the one band image and the conveyance of the sheet PM to thereby print the entire image on the sheet PM. Hereinafter, processing of printing the band image by ejecting ink droplets on one band region of the sheet PM while moving the print head 292 in the main scanning direction is also referred to as "ejection processing." The first direction D1 is also referred to as "forward direction D1," and the second direction D2 is also referred to as "backward direction D2." The band image printed by the ejection processing in the forward direction D1 is also referred to as "forward direction band image," and band image printed by the ejection processing in the backward direction D2 is also referred to as "backward direction band image."

The band region PAa illustrated in FIG. 2A is a band region in which the band image is printed by the print head 292 moved in the forward direction D1 (thus, the band region PAa is also referred to as "forward direction band region PAa"). The band region PAb is a band region in which the band image is printed by the print head 292 moved in the backward direction D2 (thus, the band region PAb is also referred to as "backward direction band region PAb"). In the example of FIG. 2A, the forward direction band regions PAa and the backward direction band regions PAb are alternately arranged along the sub-scanning direction D3. The print head 292 prints the band image in moving operations in both reciprocating directions along the main scanning direction, that is, in both a moving operation in the forward direction D1 and a moving operation in the backward direction D2, allowing high-speed printing. However, as described later, there may be a case where the ejection processing in one direction is executed continuously a plurality of times.

Figure 2C:
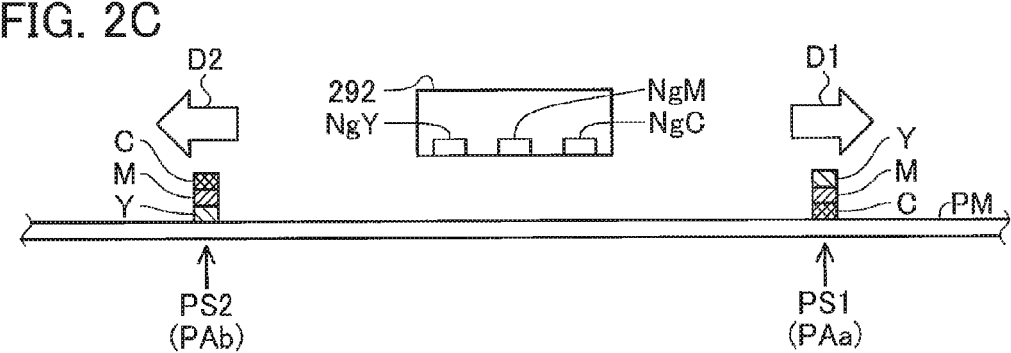
FIG. 2C is an explanatory view illustrating an overlapping order of inks on a sheet.

FIG. 2C is an explanatory view illustrating an overlapping order of the inks on the sheet PM. In FIG. 2C, the print head 292 and the sheet PM are viewed in the sub-scanning direction D3. The right part of FIG. 2C illustrates that the cyan ink, the magenta ink, and the yellow ink are overlapped on a position PS1 in the forward direction band region PAa, in this order (C, M, Y) from a side closer to a surface of the sheet PM. When the print head 292 moved in the forward direction D1 places the three-color inks on the same position PS1, the nozzle group NgC, the nozzle group NgM, and the nozzle group NgY eject the corresponding inks in this order (NgC, NgM, NgY). The left part of FIG. 2C illustrates that the yellow ink, the magenta ink, and the cyan ink are overlapped on a position PS2 in the backward direction band region PAb, in this order (Y, M, C) from the side closer to the surface of the sheet PM. When the print head 292 moved in the backward direction D2 places the three-color inks on the same position PS2, the nozzle group NgY, the nozzle group NgM, and the nozzle group NgC eject the corresponding inks in this order (NgY, NgM, NgC). As described above, the ink overlapping order (i.e., ink ejecting order) in the ejection processing in the backward direction D2 is opposite to the ink overlapping order (i.e., ink ejecting order) in the ejection processing in the forward direction D1.

When the ink overlapping order differs between printed two colors, the two colors may look different from each other even though the inks constituting one color and inks constituting the other color are the same in type and amount. For example, there may be a case where a color at the position PS1 of FIG. 2C and a color at the position PS2 of FIG. 2C look different from each other.

Figure 3A:
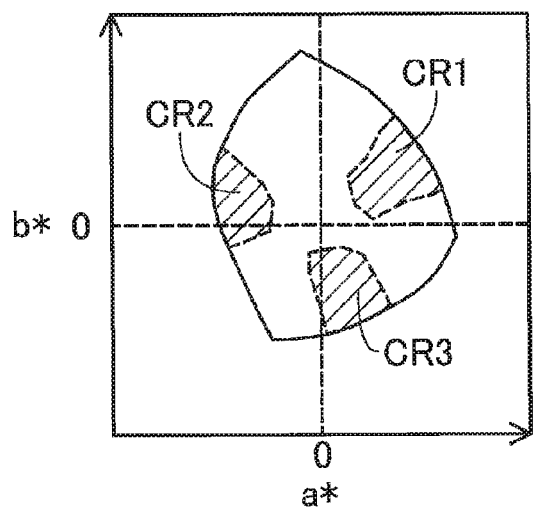
Figure 3B:
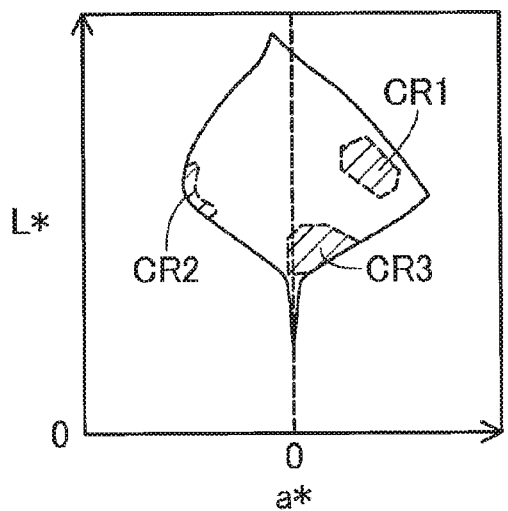
Figure 3C:
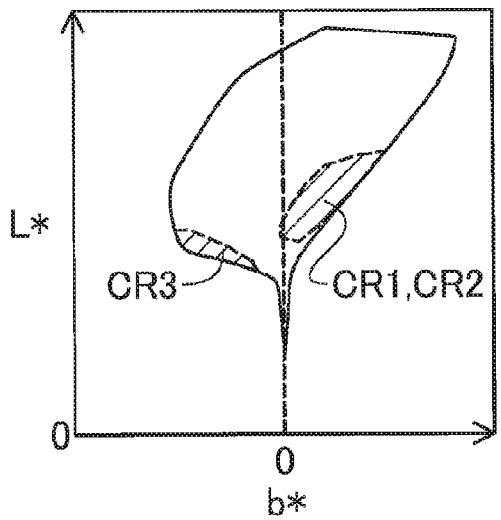

FIGS. 3A, 3B, and 3C are graphs each illustrating an example of a range of a color exhibiting a large difference in color due to the difference in the ink overlapping order. In each of FIGS. 3A to 3C, the printed color range is represented by a CIELAB color space. FIG. 3A illustrates a graph in which the color range is projected to a*b* plane, FIG. 3B illustrates a graph in which the color range is projected to a*L* plane, and FIG. 3C illustrates a graph in which the color range is projected to b*L* plane. Hatched color ranges CR1, CR2, and CR3 in each of FIGS. 3A to 3C each denote a color range in which a color difference between a colorimetric value of a color printed in the ejection processing in the forward direction D1 and a colorimetric value of a color printed in the ejection processing in the backward direction D2 is equal to or more than a predetermined threshold. As a calculation expression of the color difference, for example, a CIE1987 L*a*b* color difference expression is used. Such a color difference between two colors is represented by a distance (Euclidean distance) between two colors in the CIELAB color space. The color ranges of FIGS. 3A to 3C are each specified as follows. That is, first, color patches of a plurality of colors distributed over the entire color range that can be printed by the print execution unit 290 are printed by the ejection processing in the forward direction D1 and the ejection processing in the backward direction D2, and then the printed plurality of color patches are measured.

As illustrated in FIG. 3A, the first color range CR1 is a red color range which is expressed with a combination of two-color inks of magenta M and yellow Y. The second color range CR2 is a green color range which is expressed with a combination of two-color inks of cyan C and yellow Y. The third color range CR3 is a blue color range which is expressed with a combination of two-color inks of cyan C and magenta M. As described above, a color difference caused due to the difference in the ink overlapping order is large in the color range expressed with a combination of two-color inks. Further, the color difference is not changed simply linearly with a change in a color component (e.g., any one of a* component, b* component, and L* component). The color ranges CR1, CR2, and CR3 of each of FIGS. 3A to 3C each exhibiting a large color difference can be changed depending on the overlapping order of a plurality of inks, an amount of each ink, a material of each ink, or the like.

Figure 4A:
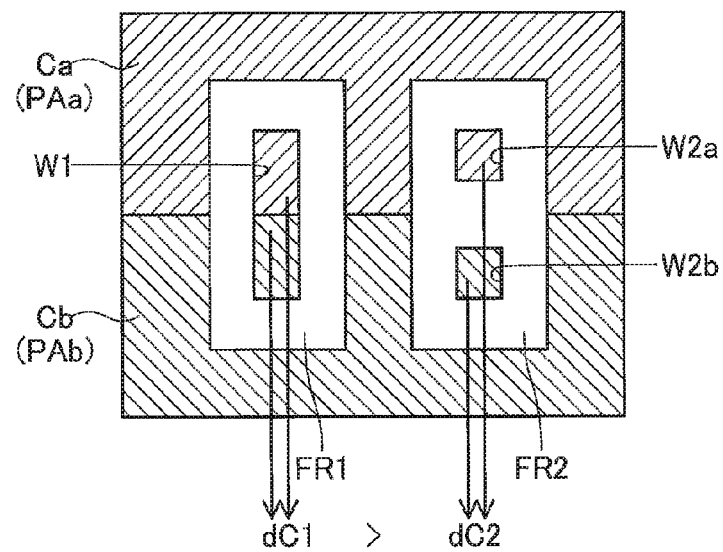

FIGS. 4A, 4B, 4C, and 4D are explanatory views of a gap in color perceived by an observer when two partial images are observed visually. In FIG. 4A, two color patches Ca and Cb are arranged up and down (the second patch Cb is disposed adjacent below the first patch Ca). The first patch Ca is a monochrome image printed by the ejection processing in the forward direction D1, and the second patch Cb is a monochrome image printed by the ejection processing in the backward direction D2. The patches Ca and Cb are images printed according to the same pixel value (pixel value represented by three components of red R, green G, and blue B). It is assumed here that a color gap between the printed patches Ca and Cb is not zero since the ink overlapping order differs between the patches Ca and Cb.

In FIG. 4A, frame-shaped tools FR1 and FR2 having different windows from each other are illustrated. The first tool FR1 has one window W1 for observing the two patches Ca and Cb in a state where they are adjacent to each other. The observer places the first tool FR1 such that a boundary between the two patches Ca and Cb is located inside the window W1 and thus can observe the patches Ca and Cb adjacent to each other. The second tool FR2 has two windows W2a and W2b for observing the two patches Ca and Cb in a state where they are separated from each other. The observer places the second tool FR2 such that the first patch Ca is located inside the first window W2a and that the second patch Cb is located inside the second window W2b and thus can observe the two patches Ca and Cb separated from each other.

In FIG. 4A, color gaps dC1 and dC2 perceived by the observer who observes the two patches Ca and Cb are illustrated. The left-side color gap dC1 represents a color gap perceived when the two patches Ca and Cb being adjacent to each other are observed (also referred to as "adjacent-state perceptual gap dC1"). The right-side color gap dC2 represents a color gap perceived when the two patches Ca and Cb being separated from each other are observed (also referred to as "separate-state perceptual gap dC2"). The perceptual gaps dC1 and dC2 are each not a color difference obtained from colorimetric values of the two patches Ca and Cb but a color gap perceived by the observer who observes the two patches Ca and Cb. The perceptual gaps dC1 and dC2 are each divided into a plurality of levels (e.g., four levels of 0 to 3) previously set, for example. The larger the value is, the larger the color gap becomes. The observer estimates the color gap perceived by observing the two patches Ca and Cb in a plurality of levels to determine the perceptual gaps dC1 and dC2.

Human's visual sense responds sensitively to a part at which hue, brightness, or saturation rapidly changes. For example, when two gray images that slightly differ from each other in brightness are adjacent to each other, the observer perceives contrast between the two gray images more strongly than in a case where they are separated from each other. Such a phenomenon is also called Mach band. Similarly, as for the two patches Ca and Cb of FIG. 4A, there may be a case where the adjacent-state perceptual gap dC1 is more than the separate-state perceptual gap dC2.

There may be a case where images represented by the same pixel value are printed at a boundary between the adjacent two regions PAa and PAb (FIG. 2A) on a single sheet PM. The observer who observes the images printed at the boundary can perceive contrast of strength represented by the adjacent-state perceptual gap dC1 (FIG. 4A) between a part printed in the forward direction band region PAa and a part printed in the backward direction band region PAb. Further, there may be a case where images represented by the same pixel value are printed in a state where they are separately positioned at a center part of the forward direction band region PAa and at a center part of the backward direction band region PAb. The observer who observes the two printed images can perceive contrast of strength represented by the separate-state perceptual gap dC2 between the two images separated from each other. As described above, the adjacent-state perceptual gap dC1 is likely to be more than the separate-state perceptual gap dC2. Thus, the observer is likely to perceive strong contrast at the boundary between the adjacent two regions PAa and PAb.

Figure 4B:
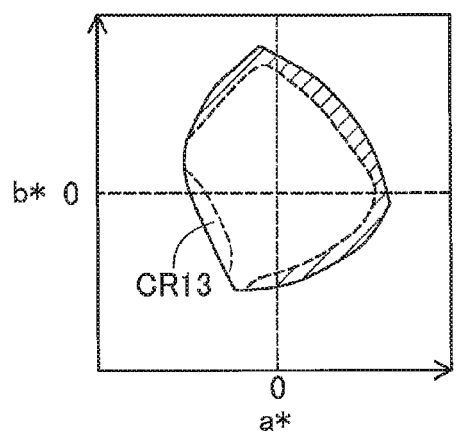
Figure 4C:
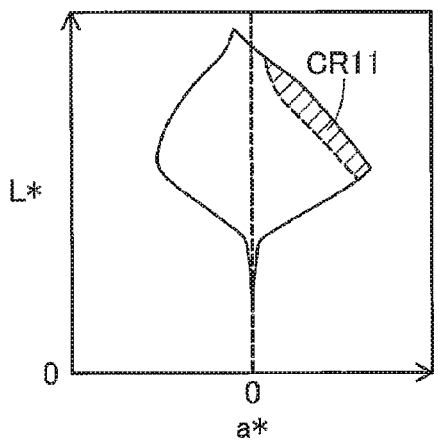
Figure 4D:
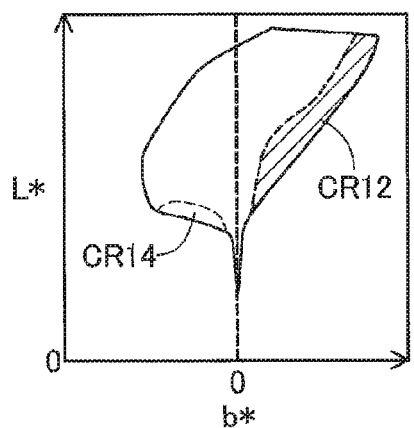

FIGS. 4B, 4C and 4D are graphs each illustrating an example of a range of a color exhibiting a large difference between the adjacent-state perceptual gap dC1 and the separate-state perceptual gap dC2. In each of FIGS. 4B to 4D, the printed color range is represented by a CIELAB color space. FIG. 4B illustrates a graph in which the color range is projected to a*b* plane, FIG. 4C illustrates a graph in which the color range is projected to a*L* plane, and FIG. 4D illustrates a graph in which the color range is projected to b*L* plane. Hatched ranges in each of FIGS. 4B to 4D each denotes a color range in which a difference (also referred to as "difference between perceptual gaps (dC1−dC2)") between the adjacent-state perceptual gap dC1 and the separate-state perceptual gap dC2 is equal to or more than a predetermined threshold. The color ranges of FIGS. 4B to 4D are each specified based on estimate results (that is, perceptual gaps dC1 and dC2) by the observer who observes the color patches of a plurality of colors described in FIGS. 3A to 3C using the tools FR1 and FR2 illustrated in FIG. 4A.

In general, as illustrated in FIG. 4B, the difference between perceptual gaps (dC1–dC2) becomes large in a color range where saturation is high. Further, as represented by a first color range CR11 of FIG. 4C, the difference between perceptual gaps may become large in a color range from white to red. Furthermore, as represented by a second color range CR12 of FIG. 4D, the difference between perceptual gaps may become large in a color range from yellow to black. On the other hand, as represented by a third color range CR13 of FIG. 4B, the difference between perceptual gaps may become small in a color range from blue to green. Further, as represented by a fourth color range CR14 of FIG. 4D, the difference between perceptual gaps may become small in a color range from blue to black.

The magnitude of the adjacent-state perceptual gap dC1, magnitude of the separate-state perceptual gap dC2, color range where the difference between perceptual gaps is large, and color range where the difference between perceptual gaps is small can be changed depending on the overlapping order of a plurality of inks, an amount of each ink, a material of each ink, or the like. That is, recognizability of the color gap (contrast) between two partial images represented by the same pixel value can differ depending on color.

In the present embodiment, the tables 134 and 136 are used in image print processing in order to reduce the color gap caused due to the difference in the ink overlapping order (details will be described later). The first table 134 (hereinafter, also referred to as "adjacent-state gap table 134") represents a degree of the color gap perceived when two partial images represented by the same pixel value and different in the ink overlapping order are adjacent to each other. The second table 136 (hereinafter, also referred to as "separate-state gap table 136") represents a degree of the color gap perceived when the above two partial images are separated from each other. The tables 134 and 136 are each a lookup table representing a correspondence between the pixel value and degree of the color gap.

FIG. 5 is a flowchart illustrating steps in creation processing of the tables 134 and 136. The tables 134 and 136 are created by the manufacturer of the multifunction peripheral 200 before shipping of the multifunction peripheral 200, for example. In S100, a plurality of color patches is printed by the print execution unit 290. FIG. 6A is an explanatory view illustrating an example of the color patches CP printed on the sheet PM. In the present embodiment, the plurality of color patches CP is associated with a plurality of grids disposed in a RGB color space, respectively. The color patches CP are disposed in a lattice shape along the main scanning direction D1 and the sub-scanning direction D3. As described below, the print execution unit 290 prints, in the sub-scanning direction D3, adjacent two color patches for each of a plurality of grids GD. These two color patches CP include a color patch CP printed by the ejection processing in the forward direction D1 and a color patch CP printed by the ejection processing in the backward direction D2. For example, color patches CP1 and CP2 illustrated in FIG. 6A are represented by a pixel value of the same grid GD. The color patch CP1 is printed by the ejection processing in the forward direction D1, and the color patch CP2 is printed by the ejection processing in the backward direction D2.

A color cube CC represented by RGB color components is illustrated in the lower part of FIG. 5. In the lower part of FIG. 5, symbols each indicating a color are added to eight vertexes of the color cube CC, respectively. Specifically, a black vertex Vk (0, 0, 0), a red vertex Vr (255, 0, 0), a green vertex Vg (0, 255, 0), a blue vertex Vb (0, 0, 255), a cyan vertex Vc (0, 255, 255), a magenta vertex Vm (255, 0, 255), a yellow vertex Vy (255, 255, 0), and a white vertex Vw (255, 255, 255) are added. Numerals in the parenthesis represent values of color components of red R, green G, and blue B, respectively. A value of the red R in each grid GD is any one of (Q+1) values obtained by equally dividing a range (0 to 255) of the red R into Q (Q is, e.g., 9, 17, or the like). The same is applied to the green G and blue B of each grid GD.

When the plurality of color patches CP are printed, the RGB value of each color patch CP is converted into a CMY value. Then, the obtained CMY value is used to perform halftone processing. Print data representing the plurality of color patches CP are generated according to a result of the halftone processing, and the print execution unit 290 prints the plurality of color patches CP according to the print data. The color conversion processing, the halftone processing, and the print data generation processing are the same as those performed in print processing to be described later using the multifunction peripheral 200 and are executed by, e.g., the processor 210 of the multifunction peripheral 200. Alternatively, the color conversion processing, the halftone processing, and the print data generation processing may be executed by another data processor connected to the multifunction peripheral 200.

As in the example of FIG. 2A, the print execution unit 290 alternately repeats the ejection processing in the forward direction D1 and the ejection processing in the backward direction D2. In one ejection processing, two lines of the color patch CP extending in the main scanning direction are printed. For example, a plurality of color patches CP of a second line L2 and a third line L3 disposed in one band region PAa are printed in one ejection processing in the forward direction D1. Further, a pair of color patches CP (e.g., two color patches CP1 and CP2) adjacent to each other across the boundary between the forward direction band region PAa and the backward direction band region PAb which are adjacently disposed are associated with the same grid GD. That is, two color patches CP, which are different from each other in the ink overlapping order, are printed onto each of the plurality of grids GD.

In S110 of FIG. 5, each of the plurality of printed color patches CP is color-measured using a spectral colorimeter. As a result, the colorimetric value of each color patch is acquired. The colorimetric value is a color value of a color space independent of a device such as the print execution unit 290 and is, in the present embodiment, a color value (hereinafter, also referred to as a Lab value) of the CIELAB color space.

In S120, a color difference dM is calculated for each of the plurality of grids GD. The color difference dM is a color difference between the colorimetric values of two color patches CD associated with one grid GD. As described above, a CIE1987 L*a*b* color difference expression is used as a calculation expression of the color difference dM. Such a color difference dM is represented by a distance between two colors in the CIELAB color space.

In S130, the adjacent-state perceptual gap dC1 and the separate-state perceptual gap dC2 are determined by visual observation of the plurality of color patches CP by an observer. As illustrated in FIG. 6A, the observer can determine the adjacent-state perceptual gap dC1 and the separate-state perceptual gap dC2 for each of the plurality of grids GD by placing the tools FR1 and FR2 on the plurality of color patches CP. In the present embodiment, in order to reduce influence of individuality of the observer with respect to the adjacent-state perceptual gap dC1, an average value of the plurality of adjacent-state perceptual gaps dC1 determined by a plurality of observers is adopted as the final adjacent-state perceptual gap dC1. The same is applied to the separate-state perceptual gap dC2. Arrangement of the plurality of color patches CP is not limited to the arrangement illustrated in FIG. 6A, but any other arrangement thereof may be adopted. Further, a method of observing the plurality of color patches CP is not limited to the method using the tools FR1 and FR2, but any other method that can compare the two color patches CP associated with the same grid GD both in the adjacent state and the separated state may be adopted.

In S140, weights γ1 and γ2 are calculated according to the perceptual gaps dC1 and dC2, respectively. FIG. 6B is a graph illustrating a correspondence between the perceptual gaps dC1, dC2 and the weights γ1 and γ2. A horizontal axis represents the perceptual gaps dC1 and dC2, and a vertical axis represents the weights γ1 and γ2. The first weight γ1 is calculated according to the adjacent-state perceptual gap dC1, and the second weight γ2 is calculated according to the separate-state perceptual gap dC2. As illustrated, when the adjacent-state perceptual gap dC1 is equal to or less than a first value V1, the first weight γ1 is "zero" (V1>0). When the adjacent-state perceptual gap dC1 is equal to or more than a second value V2, the first weight γ1 is "1.0" (V1<V2<3). In a range between the first value V1 and the second value V2, the first weight γ1 is linearly changed from zero to 1.0 with a change of the adjacent-state perceptual gap dC1 from the first value V1 to the second value V2. A relationship between the second weight γ2 and the separate-state perceptual gap dC2 is the same as that between the first weight γ1 and the adjacent-state perceptual gap dC1. The values V1 and V2 are previously determined. Specifically, in order to reduce recognizability of the color gap, the V1 and V2 are set to a lower value; on the other hand, in order to increase printing speed, the V1 and V2 are set to a higher value.

In S150 of FIG. 5, the color difference dM1 and the weights γ1 and γ2 are used to create the tables 134 and 136. Specifically, a proximity estimate value F1 and a separation estimate value F2 are calculated for each grid GD (RGB value, in this case). FIG. 6C is a view illustrating an example of calculation expressions of the respective estimate values F1 and F2. The proximity estimate value F1 is a value obtained by multiplying the color difference dM by the first weight γ1, and the separation estimate value F2 is a value obtained by multiplying the color difference dM by the second weight γ2. A threshold Th written in the right part of FIG. 6C is a threshold value to be compared with an estimate value to be described later calculated using the estimate values F1 and F2.

The proximity estimate value F1 is a value equal to or more than zero and equal to or less than the color difference dM and becomes larger as the adjacent-state perceptual gap dC1 becomes larger. Such a proximity estimate value F1 represents, when one partial image represented by the RGB value of the grid GD is printed over the forward direction band region PAa and the backward direction band region PAb which are adjacently disposed, a magnitude of the color gap perceived by an observer who observes a part of the partial image that is positioned on the forward direction band region PAa and a part of the partial image that is positioned on the backward direction band region PAb.

The separation estimate value F2 is a value equal to or more than zero and equal to or less than the color difference dM and becomes large as the separate-state perceptual gap dC2 becomes large. Such a separation estimate value F2 represents, when two images represented by the RGB value of the grid GD are printed separately from each other on the forward direction band region PAa and the backward direction band region PAb, a magnitude of the color gap perceived by an observer who observes the two partial images separated from each other.

The adjacent-state gap table 134 stores a correspondence between the RGB value of the grid GD and the proximity estimate value F1 of the same grid GD. The separate-state gap table 136 stores a correspondence between the RGB value of the grid GD and the separation estimate value F2 of the same grid GD. The correspondence for each of the plurality of grids GD is stored in the tables 134 and 136 and, whereby, the creation of the tables 134 and 136 is completed.

As described in FIG. 4A, generally, the adjacent-state perceptual gap dC1 is equal to or more than the separate-state perceptual gap dC2. Therefore, when the proximity estimate value F1 and the separation estimate value F2 associated with the same RGB value are compared to each other, F1≥F2 is satisfied. In the present embodiment, the above tables 134 and 136 are configured such that the proximity estimate value F1 of the adjacent-state gap table 134 and the separation estimate value F2 of the separate-state gap table 136 for the same RGB value satisfy the following condition: F1≥F2.

FIG. 7 is a flowchart illustrating steps in print processing. In the present embodiment, the processor 110 of the image processing apparatus 100 executes the processing of FIG. 7 according to the program 132. The processor 110 starts the processing of FIG. 7 according to a print start instruction input through the manipulation unit 150 by a user.

In S200, the processor 110 acquires image data to be printed (also referred to as "target image data"). For example, the processor 110 acquires image data specified in the print start instruction from the user or an application program as the target image data. It is assumed in the present embodiment that the target image data is bitmap data and that a pixel value of each pixel constituting the target image data is represented by 256 gradations of a 0-255 RGB (Red, Green, Blue) value. When the specified image data has a format (e.g., Enhanced Meta File (EMF) format) different from the bitmap, the processor 110 uses the bitmap data obtained by applying conversion (e.g., rasterization) as the target image data. Further, when a pixel density of the image data differs from a predetermined pixel density for the print processing, the processor 110 converts the pixel density into the pixel density for the print processing.

In S205, the processor 110 acquires band data representing one unprocessed band image of a target image represented by the target image data. In the present embodiment, the target image is divided into a plurality of band images arranged in the sub-scanning direction D3. Since the sheet PM is conveyed in the sub-scanning direction D3, the plurality of band images are printed sequentially one by one in a direction opposite to the sub-scanning direction D3. In S205, the processor 110 selects, from one or more unprocessed band images, a band image positioned at an end on the sub-scanning direction D3 side (that is, the band image to be printed earliest among one or more unprocessed band images) and acquires band data of the selected band image. Hereinafter, the band image selected in S205 is also referred to as "target band image," and a part of the target image data that represents the target band image is also referred to as "target band data."

In S210, the processor 110 determines, as the direction of the ejection processing for printing the target band image (also referred to as "target ejection processing"), the forward direction D1 or the backward direction D2. Although details will be described later, the processor 110 estimates a degree of the color gap perceived by an observer who observes the target band image and caused due to the difference in the ink overlapping order. The processor 110 calculates an estimate value representing a result of the estimate by referring to the pixel value represented by the target band data and the tables 134 and 136. When the color gap represented by the estimate value is comparatively large, the processor 110 determines, as the direction of the target ejection processing, a predetermined direction (in the present embodiment, forward direction D1), irrespective of the direction of the previous ejection processing. Thus, when an object (e.g., a circle graph) having a color comparatively large in color difference represented by the estimate value is represented by a plurality of band images, the plurality of band images are each printed by the ejection processing in the forward direction D1, whereby recognizability of the color difference is reduced. When the color gap represented by the estimate value is comparatively small, the processor 110 determines, as the direction of the target ejection processing, a direction opposite to the direction of the previous ejection processing, whereby printing speed can be increased.

In S220, the processor 110 converts the pixel value of each pixel constituting the target band data from the RGB value to CMY value corresponding to color components of print color materials. A correspondence between the RGB value and CMY value is defined by a lookup table (not illustrated) previously stored in the non-volatile storage device 130. The processor 110 executes the color conversion by referring to the lookup table.

In S230, the processor 110 uses the target band data after color conversion to execute halftone processing. As the halftone processing, processing according to a so-called error diffusion method is performed. Alternatively, a method using a dither matrix may be adopted.

In S240, the processor 110 uses a result of the halftone processing to generate band print data for use in printing the target band image. The band print data is data of a format that can be interpreted by the control unit 298 of the print execution unit 290 of the multifunction peripheral 200. The band print data includes information representing the direction (forward direction D1 or backward direction D2) of the target ejection processing, information representing a result (ink dot pattern) of the halftone processing, and information representing a conveying amount in the conveying processing of the sheet PM to be performed after the target ejection processing.

In S250, the processor 110 supplies the generated band print data to the multifunction peripheral 200. The processor 210 of the multifunction peripheral 200 supplies the received band print data to the print execution unit 290. In S255, the control unit 298 of the print execution unit 290 controls the print head 292, the head moving unit 294, and conveying unit 296 according to the band print data to execute the target ejection processing and the conveying processing, whereby the target band image is printed.

In S260, the processor 110 of the image processing apparatus 100 determines whether or not all the band images have been processed. When determining that there is any unprocessed band image (S260: NO), the processor 110 returns to S205 and executes processing for the unprocessed band image. When determining that all the band images have been processed (S260: YES), the processor 110 ends the print processing.

As described above, the processor 110 of the image processing apparatus 100 generates the print data (S240) and supplies the generated print data to the multifunction peripheral 200 (S250) to thereby control the multifunction peripheral 200 (and the print execution unit 290). Specifically, the processor 110 makes the print execution unit 290 repeatedly execute the ejection processing for printing the band image and moving processing of moving the sheet PM in the sub-scanning direction D3 with respect to the print head 292 to thereby make the print execution unit 290 print the image. The processor 110 determines the direction of the ejection processing for each band image (S210).

Figure 9:
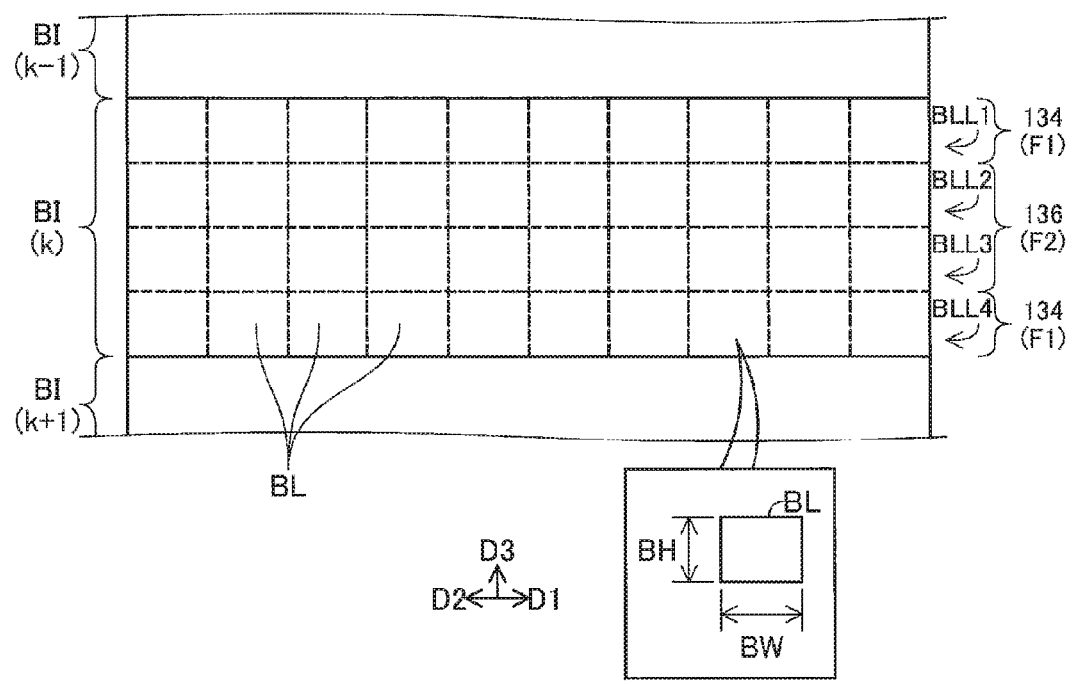
FIG. 9 is an explanatory view illustrating a band image and a plurality of blocks.

FIG. 8 is a flowchart illustrating steps in determination processing of the direction of the ejection processing. In S300 of FIG. 8, the processor 110 divides the target band image into a plurality of blocks. FIG. 9 is an explanatory view illustrating the band image and a plurality of blocks. A band image BI(k) of FIG. 9 denotes a k-th band image to be processed (k is an integer). The band image BI(k) is divided into a plurality of blocks BL. Each block BL has a rectangular shape. The plurality of blocks BL are closely disposed in a lattice shape along the main scanning direction D1 and the sub-scanning direction D3. A height BH of the block BL in the sub-scanning direction D3 and a width BW thereof in the main scanning direction D1 are previously fixed. In the present embodiment, arrangement of the plurality of blocks BL in the target band image is previously fixed.

In the embodiment illustrated in FIG. 9, one band image is divided into four lines BLL1 to BLL4 of the blocks BL extending in the main scanning direction. The first line BLL1 is a line of the blocks BL adjacent to a preceding band image BI(k−1). The fourth line BLL4 is a line of the blocks BL adjacent to a succeeding band image BI(k+1). The second and third lines BLL2 and BLL3 are each a line of the blocks BL separated from another band image.

In S310 of FIG. 8, the processor 110 selects one unprocessed block BL (referred to "target block") from the plurality of blocks of the target band image. In S320, the processor 110 determines whether or not the target block is adjacent to another band image.

When the target block is included in any of the lines BLL1 and BLL4 of FIG. 9, the processor 110 determines that the target block is adjacent to another band image (S320: YES). In this case, the processor 110 calculates the estimate value of the target block by using the adjacent-state gap table 134 in S325. Specifically, the processor 110 specifies the proximity estimate value F1 (FIG. 6C) of each of the plurality of pixels by using the pixel value of each of the plurality of pixels included in the target block and the adjacent-state gap table 134. The proximity estimate value F1 of the pixel value between the plurality of grids GD in the adjacent-state gap table 134 is calculated by interpolation. Then, the processor 110 calculates an average value of the proximity estimate values F1 of the plurality of pixels as an estimate value EV of the target block. A large value of the calculated estimate value EV means that when a pixel value equal to the pixel value included in the target block is included in an adjacent block (block of another band image) adjacent to the target block, the color gap between the target block and the adjacent block, which is perceived by the observer, is large (in particular, in a case where the direction of the ejection processing for the adjacent block is opposite to the direction of the ejection processing for the target block).

When the target block is included in any of the lines BLL2 and BLL3, the processor 110 determines that the target block is separated from another band image (S320: NO). In this case, in S330, the processor 110 calculates the estimate value of the target block by using the separate-state gap table 136. Specifically, the processor 110 specifies the separation estimate value F2 (FIG. 6C) of each of the plurality of pixels by using the pixel value of each of the plurality of pixels included in the target block and the separate-state gap table 136. The separation estimate value F2 of the pixel value between the plurality of grids GD in the separate-state gap table 136 is calculated by interpolation. Then, the processor 110 calculates an average value of the separation estimate values F2 of the plurality of pixels as the estimate value EV of the target block. A large value of the calculated estimate value EV means that when a pixel value equal to the pixel value included in the target block is included in a separation block (block of another band image) separated from the target block, the color gap between the target block and adjacent block, which is perceived by the observer, is large (in particular, in a case where the direction of the ejection processing for the adjacent block is opposite to the direction of the ejection processing for the target block).

After calculation of the estimate value EV in S325 or S330, the processor 110 determines in S350 whether or not the estimate value EV is equal to or more than a predetermined threshold Th. When determining that the estimate value EV is equal to or more than the threshold Th (S350: YES), the processor 110 determines, as the direction of the target ejection processing, a predetermined direction (in this case, forward direction D1) in S355. Then, in S370, the processor 110 stores information representing a correspondence between the target ejection processing and the direction in a storage device (e.g., volatile storage device 120) and ends the processing of FIG. 8. The information stored in the storage device in S370 is referred to in S240 of FIG. 7.

When determining that the estimate value EV is less than the threshold Th (S350: NO), the processor 110 determines in S360 whether or not all the blocks in the target band image have been processed. When determining that there is any unprocessed block (S360: NO), the processor returns to S310 and executes the processing for the unprocessed block. When determining that all the blocks in the target band image have been processed (S360: YES), the processor 110 determines, as the direction of the target ejection processing, a direction opposite to the direction of the previous ejection processing in S365. Then, the processor 110 executes S370 and, thereafter, ends the processing of FIG. 8.

Figure 10:
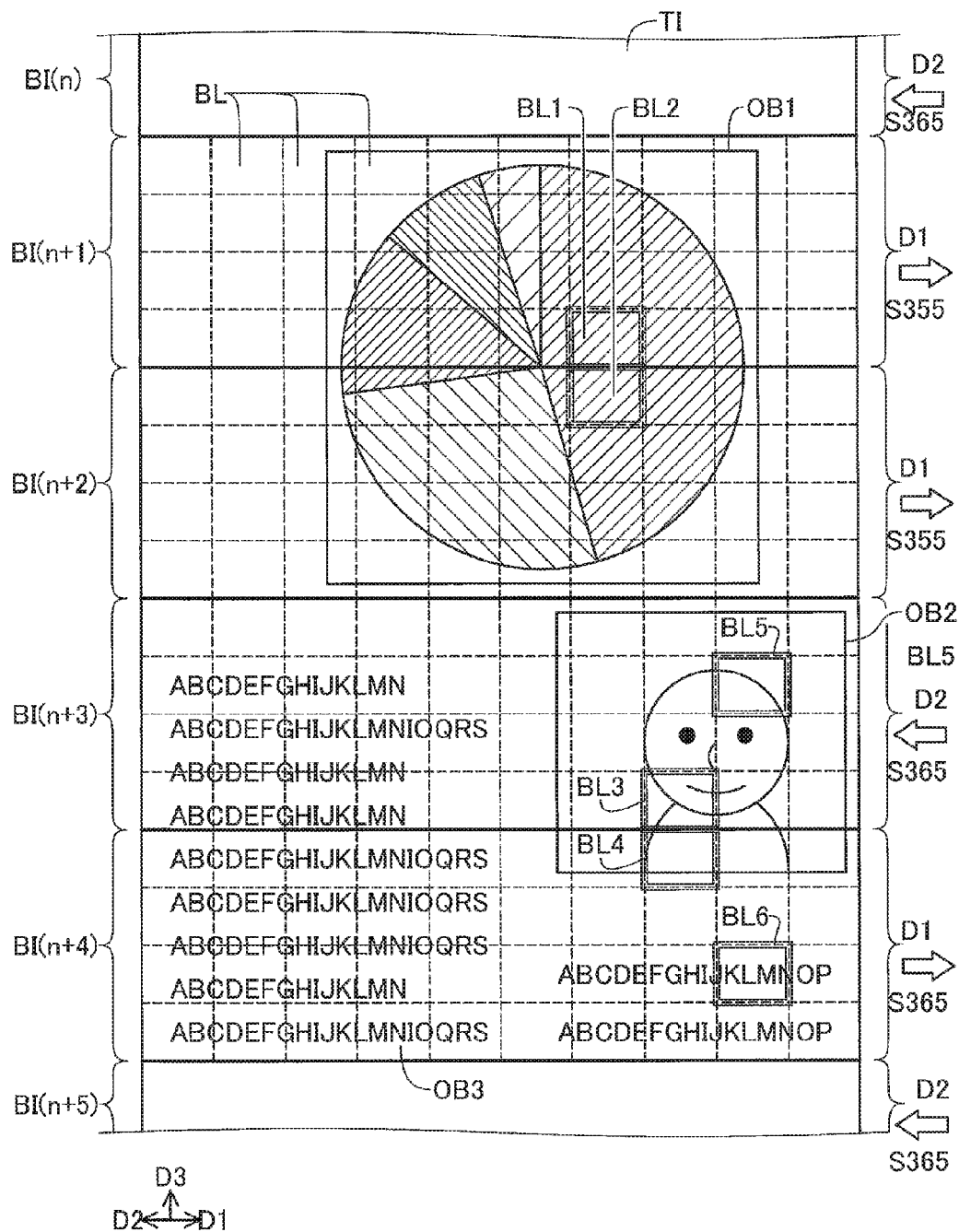
FIG. 10 is an explanatory view illustrating an example of determination of the direction of the ejection processing.

FIG. 10 is an explanatory view illustrating an example of determination of the direction of the ejection processing. FIG. 10 illustrates an example of a target image TI. The target image TI of FIG. 10 includes three objects OB1, OB2, and OB3. The first object OB1 is a circle graph including a plurality of solid regions (regions each represented by the same pixel value). The second object OB2 is a photograph. The third object OB3 is character strings. In FIG. 10, n-th to (n+5)-th band images BI(n) to BI(n+5) of a plurality of band images constituting the target image TI are illustrated (n is an integer).

In the example of FIG. 10, the circle graph OB1 is represented by a plurality of blocks in the adjacent two band images BI(n+1) and BI(n+2). It is assumed here that the proximity estimate value F1 associated with a color of a solid region including blocks BL1 and BL2 is more than the threshold Th.

The block BL1 illustrated in FIG. 10 is one of the plurality of blocks representing at least a part of the circle graph OB1. More in detail, the block BL1 is included in the band image BI(n+1) and adjacent to the adjacent band image BI(n+2). In the example of FIG. 10, the estimate value EV of this block BL1 is more than the threshold Th (S350: YES of FIG. 8). Therefore, the forward direction D1 is determined as the direction of the ejection processing for the band image BI(n+1) (S355 of FIG. 8).

The block BL2 illustrated in FIG. 10 is also one of the plurality of blocks representing at least a part of the circle graph OB1. More in detail, the block BL2 is included in the band image BI(n+2) and adjacent to the adjacent band image BI(n+1). In the example of FIG. 10, the estimate value EV of this block BL2 is more than the threshold Th (S350: YES of FIG. 8). Therefore, the forward direction D1 is determined as the direction of the ejection processing for the band image BI(n+2) (S355 of FIG. 8).

As described above, when the object represented by the color associated with the large proximity estimate value F1 is represented by the adjacent two band images, the two band images are printed by the ejection processing in the same direction. This can suppress a part of the object that is included in one band image and a part of the object that is included in the other band image from appearing to be different in color. Similarly, when one object is represented by three or more band images, all the band images representing the one object can be printed by the ejection processing in the same direction. This can reduce a possibility that a part appearing to be different in color is generated in a region of the same color.

As for the other band images BI(n), BI(n+3), BI(n+4), and BI(n+5) of FIG. 10, it is assumed that the estimate values EV of all the blocks are less than the threshold Th. Therefore, a direction opposite to the direction of the previous ejection processing is determined as the direction of the ejection processing for these band images BI(n), BI(n+3), BI(n+4), and BI(n+5). As a result, the ejection processing in the forward direction D1 and the ejection processing in the backward direction D2 are alternately repeated toward a direction opposite to the sub-scanning direction D3, whereby printing speed can be increased.

Further, in FIG. 10, a third block BL3 and a fourth block BL4 are adjacent blocks included in the adjacent band images BI(n+3) and BI(n+4), respectively. A fifth block BL5 and a sixth block BL6 are blocks positioned in center portions of the adjacent band images BI(n+3) and BI(n+4), respectively. As described in FIG. 4A, the adjacent-state perceptual gap dC1 can be more than the separate-state perceptual gap dC2. Thus, when the pixel values of the plurality of pixels constituting the blocks BL3, BL4, BL5, and BL6 are the same, the observer can perceive the color gap among the adjacent blocks BL3 and BL4 largely than the color gap between the blocks BL5 and BL6 separated from each other.

As illustrated in FIG. 8, the adjacent-state gap table 134 is applied to a block adjacent to the other band image (S325 of FIG. 8); on the other hand, the separate-state gap table 136 is applied to a block separated from the other band image (S330 of FIG. 8). In the example of FIG. 10, the adjacent-state gap table 134 representing the proximity estimate value F1 which is a comparatively large value is applied to the blocks BL3 and BL4 between which the color gap is comparatively easily recognizable. On the other hand, the separate-state gap table 136 representing the separation estimate value F2 which is a comparatively small value is applied to the blocks BL5 and BL6 between which the color gap is comparatively unrecognizable. Thus, the head moving direction can be determined considering that recognizability of the color gap caused due to the difference in the ink overlapping order differs in accordance with a position in the band image.

In particular, as described in S350 of FIG. 8, when the color gap represented by the estimate value EV is comparatively large (S350: YES), a predetermined direction (forward direction D1) is determined as the direction of the target ejection processing (S355). Thus, recognizability of the color gap can be reduced as in the case of the band images BI(n+1) and BI(n+2) of FIG. 10. Further, when the color gap represented by the estimate value EV is comparatively small (S350: NO), a direction opposite to the direction of the previous ejection processing is determined as the direction of the target ejection processing (S365). Thus, printing speed can be increased as in the case of the band images BI(n+2) to BI(n+5) of FIG. 10.

Further, as described above, the proximity estimate value F1 to be applied to the adjacent blocks BL3 and BL4 is equal to or more than the separation estimate value F2 to be applied to the separated blocks BL5 and BL6. As for a specific pixel value for which the adjacent-state perceptual gap dC1 (FIG. 4) is more than the separate-state perceptual gap dC2, the proximity estimate value F1 is more than the separation estimate value F2 (for example, a pixel value representing the color represented by hatching in FIGS. 4B to 4D). For example, assume that the blocks BL3 and BL4 include a pixel having such a specific pixel value. In this case, when the estimate values EV of the blocks BL3 and BL4 are equal to or more than the threshold Th, the direction of the ejection processing for the blocks BL3 and BL4 can be the same. This can reduce recognizability of the color gap between the adjacent blocks BL3 and BL4. Further, assume that the blocks BL5 and BL6 include a pixel having the same specific pixel value. In this case, when the estimate values EV of the blocks BL5 and BL6 are less than the threshold Th, the direction of the ejection processing for the fifth block BL5 can be opposed to the direction of the ejection processing for the sixth block BL6. This can increase printing speed. As described above, the direction of the ejection processing can be determined considering that the color gap between two printed images between which the ink overlapping order is different are recognizable more in a case where the two images are adjacent than in a case where they are separated.

Further, as described in FIG. 6C, the proximity estimate value F1 represented by the adjacent-state gap table 134 and the separation estimate value F2 represented by the separate-state gap table 136 become large as the color difference dM becomes large. As described in FIG. 5 and FIGS. 6A to 6C, the color difference dM is a distance between two colors in the CIELAB color space when the colorimetric value of the color patch CP printed by the ejection processing in the forward direction D1 and the colorimetric value of the color patch CP printed by the ejection processing in the backward direction D2 are represented in the CIELAB color space. Thus, the direction of the ejection processing can be determined suitably for the color gap represented by the distance in the CIELAB color space.

Further, as described in FIGS. 3A to 3C, the color difference dM between the color printed by the ejection processing in the forward direction D1 and the color printed by the ejection processing in the backward direction D2 is large in a range of a color printed with a combination of two-color inks (color ranges CR1, CR2, and CR3). The color difference is zero for the color printed with one ink. As described in FIG. 6C and FIG. 8, the estimate values F1 and F2 and then the direction of the ejection processing are determined based on such a color difference dM. As described above, when the color difference for the color printed with a combination of two inks is more than the color difference for the color printed with one ink, the direction of the ejection processing can be determined suitably for such a color difference.

Further, as described in FIG. 5 and FIGS. 6A to 6C, the proximity estimate value F1 represented by the adjacent-state gap table 134 becomes large as the adjacent-state perceptual gap dC1 estimated by visual observation becomes large. Further, the separation estimate value F2 represented by the separate-state gap table 136 becomes large as the separate-state perceptual gap dC2 estimated by visual observation becomes large. Thus, the direction of the ejection processing can be determined suitably for the color gap perceived by visual observation.

Further, as can be seen from FIGS. 6B and 6C, the larger a difference between the adjacent-state perceptual gap dC1 and the separate-state perceptual gap dC2 is, the larger a difference between the proximity estimate value F1 and the separation estimate value F2 becomes. For example, as for the color of each of the color ranges CR11 (FIG. 4C) and CR12 (FIG. 4D), a difference between the adjacent-state perceptual gap dC1 and the separate-state perceptual gap dC2 is more than that for the color of the unhatched color range (color range CR13 or CR14), resulting in a large difference between the proximity estimate value F1 and the separation estimate value F2. Thus, even when the difference between the adjacent-state perceptual gap dC1 and the separate-state perceptual gap dC2 is changed complicatedly according to a component value (e.g., L*a*b* value or RGB value) representing a color, the direction of the ejection processing can be determined suitably for the gap of color that is changed according to the component value.

Further, as described in FIGS. 4C and 4D, the first color range CR11 is a color range from white to red, the second color range CR12 is a color range from yellow to black, the third color range CR13 is a color range from blue to green, and the fourth color range CR14 is a color range from blue to black. Pixel values in the RGB color space associated with the color ranges CR11 to CR14 include the following values on a straight line in the color cube CC illustrated in the lower part of FIG. 5. That is, the pixel values of the first color range CR11 include pixel values on a straight line 11 connecting a white vertex Vw and a red vertex Vr. The pixel values of the second color range CR12 include pixel values on a straight line 12 connecting a yellow vertex Vy and a black vertex Vk. The pixel values of the third color range CR13 include pixel values on a straight line 13 connecting a blue vertex Vb and a green vertex Vg. The pixel values of the fourth color range CR14 include pixel values on a straight line 14 connecting the blue vertex Vb and black vertex Vk. As described above, in the RGB color space, as for the colors of the pixel values on the straight lines 11 and 12, a difference between the adjacent-state perceptual gap dC1 and the separate-state perceptual gap dC2 are more than that for the colors of the pixel values of on the straight lines 13 and 14, resulting in a large difference between the proximity estimate value F1 and the separation estimate value F2. Thus, even when the difference between the adjacent-state perceptual gap dC1 and the separate-state perceptual gap dC2 is changed complicatedly according to the pixel value in the RGB color space, the direction of the ejection processing can be determined suitably for the gap of color that is changed according to the pixel value.

Further, as described in FIGS. 2A to 2C, in the present embodiment, when the plurality of nozzle groups NgC, NgM, and NgY eject ink droplets to the same position on the sheet PM, an ejection order of the ink droplets in the ejection processing in the forward direction D1 is opposed to the ejection order of the ink droplets in the ejection processing in the backward direction D2. That is, the plurality of nozzle groups NgC, NgM, and NgY corresponding to inks of a plurality of colors are used commonly for both the ejection processing in the forward direction D1 and the ejection processing in the backward direction D2. This eliminates the need for the print head 292 to separately have nozzle groups for forward direction D1 and nozzle groups for backward direction D2, thereby simplifying a configuration of the print head 292.

B. Second Embodiment

Figure 11:
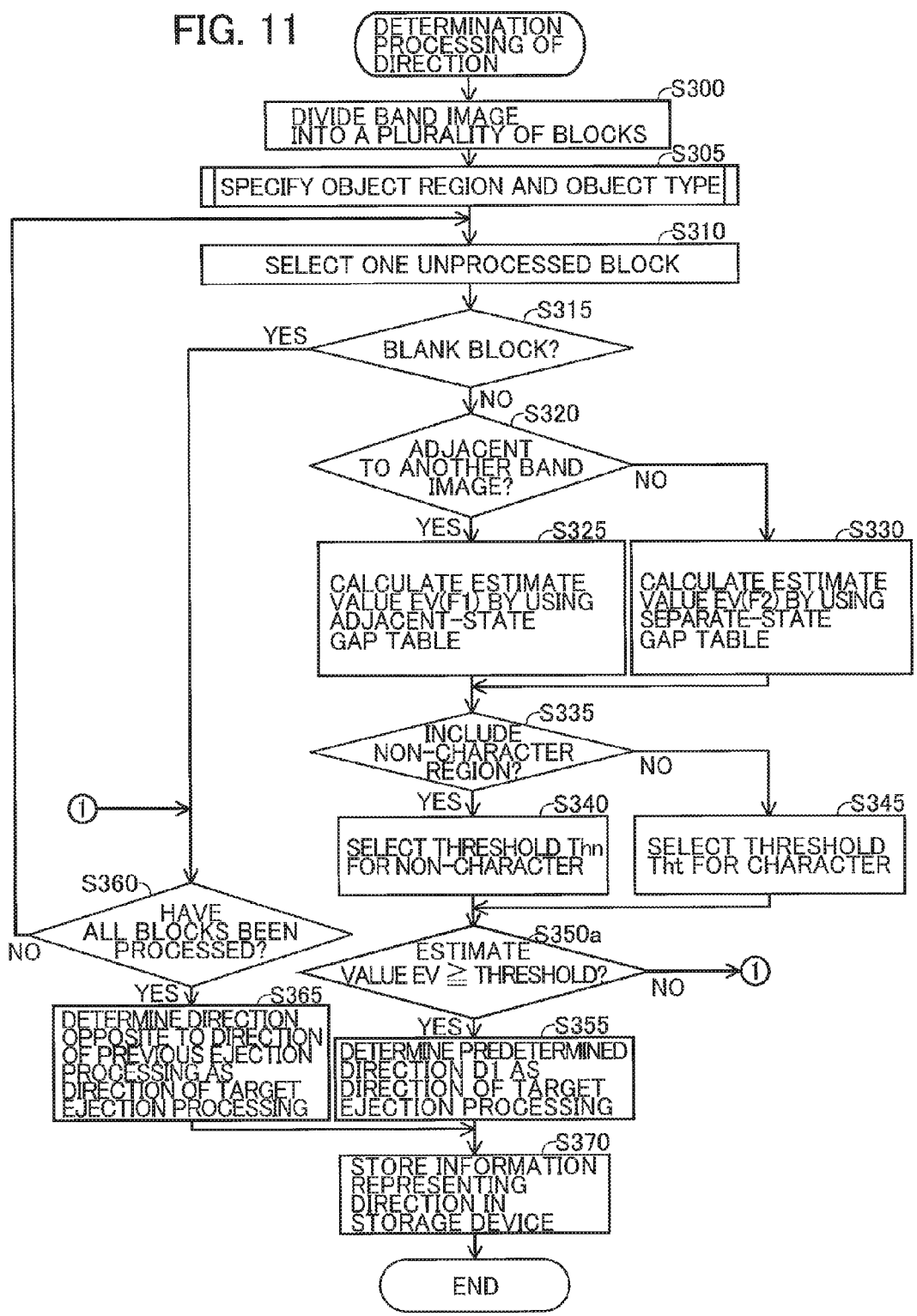
FIG. 11 is a flowchart illustrating steps in determination processing of a direction of ejection processing in a second embodiment.

FIG. 11 is a flowchart illustrating another embodiment of the determination processing of the direction of the ejection processing. The determination processing of FIG. 11 differs from that of the first embodiment (FIG. 8) only in that a threshold to be compared with the estimate value EV is determined depending on a type of the object represented by the block BL. As compared with the flowchart of FIG. 8, the flowchart of FIG. 11 newly includes steps S305, S315, S335, S340, and S345, and includes a step S350a in place of a step S350. In the flowchart of FIG. 11, the same reference numerals are given to the same steps as those in the flowchart of FIG. 8 to avoid duplicating description.

Figure 12:
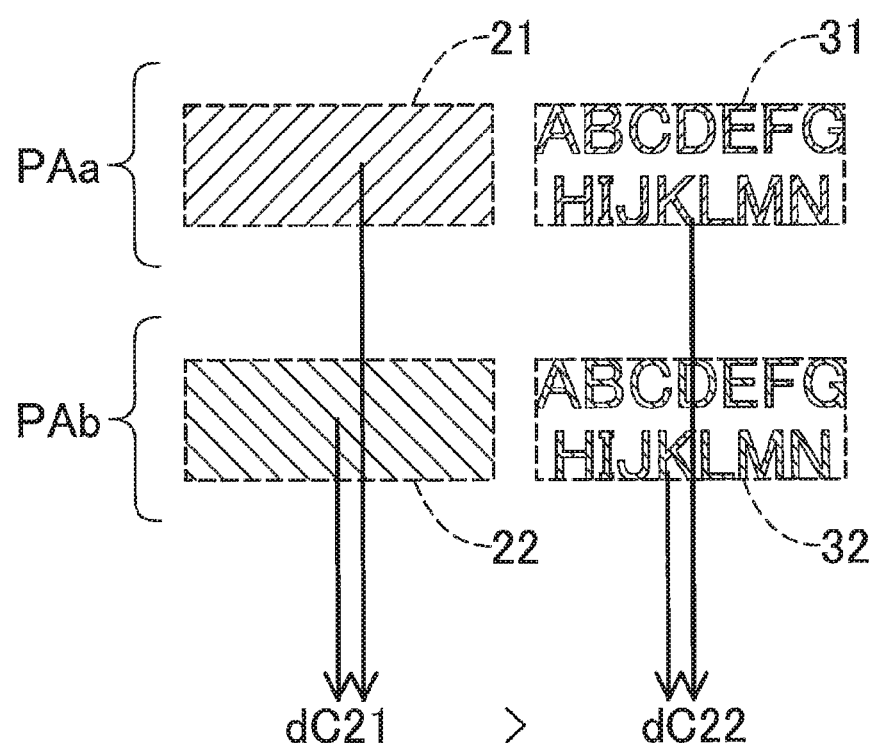
FIG. 12 is an explanatory view illustrating a relationship between an object type and a color gap.

FIG. 12 is an explanatory view illustrating a relationship between the object type and the color gap. In FIG. 12, two solid regions 21, 22 and two character string regions 31, 32 are illustrated. The solid regions 21 and 22 are each a region representing a monochrome image, and the character string regions 31 and 32 are each a region representing a character string. The monochrome images of the solid regions 21, 22 and the character strings of the character string regions 31, 32 are represented by the same pixel value. The upper-side solid region 21 and the upper-side character string region 31 are printed by the ejection processing in the forward direction D1 on the forward direction band region PAa. The lower-side solid region 22 and the lower-side character string region 32 are printed by the ejection processing in the backward direction D2 on the backward direction band region PAb. A left-side color gap dC21 represents color gap perceived by an observer who observes the two solid regions 21 and 22. A right-side color gap dC22 represents color gap perceived by an observer who observes the two character string regions 31 and 32.

As illustrated, the character string regions 31 and 32 each have a higher percentage of a background part than the solid regions 21 and 22. That is, the percentage of the number of pixels that represent the object (character string) in the character string regions 31 and 32 is lower than the percentage of the number of pixels that represent the object (monochrome image) in the sold regions 21 and 22. Thus, the color gap dC22 perceived by the observer who observes the two character string regions 31 and 32 may often be lower than the color gap dC21 perceived by the observer who observes the two solid regions 21 and 22.

Generally, a region representing an object of a type (photograph, graphic, etc.) different from the character has a lower percentage of the background part than a region representing the character. Thus, the color gap caused due to the difference in the ink overlapping order is more recognizable in the region representing the object of a type different from the character than in the region representing the character. Thus, the determination processing (FIG. 11) of the second embodiment is configured such that a determination result of S350a is more likely to be affirmative (YES) when the block BL represents the object of a type different from the character than when the block BL represents the character. Hereinafter, processing of FIG. 11 will be described concretely.

Figure 13:
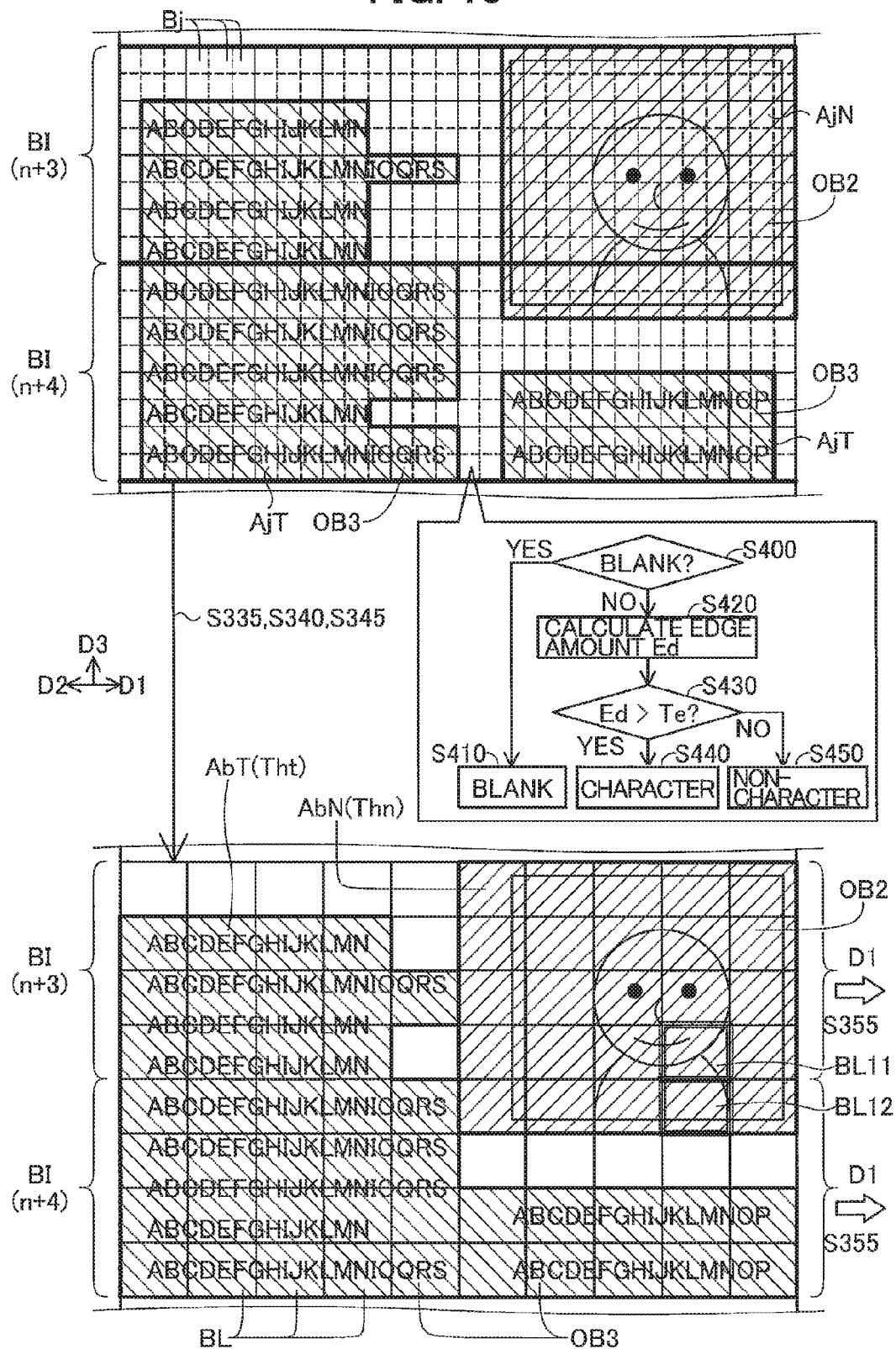
FIG. 13 is an explanatory view illustrating an example of specification of a region representing an object and a type of the object and an example of determination of the direction of the ejection processing.

In S305 after completion of S300, the processor 110 specifies a region of the target band image that represents an object and a type of the object. FIG. 13 is an explanatory view illustrating an example of specification of the region representing the object and the type of the object and an example of determination of the direction of the ejection processing. In FIG. 13, the band images BI(n+3) and BI(n+4) described in FIG. 10 are illustrated. The object OB2 (photograph) and the object OB3 (character strings) are represented by a plurality of blocks of adjacent two band images BI(n+3) and BI(n+4). The plurality of blocks may be arranged such that edges of the blocks are overlapped with an edge of the region representing the object in the target band image.

In S305 of FIG. 11, as illustrated in an upper part of FIG. 13, the processor 110 divides the target band image into a plurality of partial regions Bj. One partial region Bj has a rectangular shape smaller than that of one block BL illustrated in FIG. 9. The plurality of partial regions Bj is closely disposed in a lattice shape along the main scanning direction D1 and the sub-scanning direction D3. Arrangement of the plurality of partial regions Bj with respect to the target band image is previously fixed. The processor 110 specifies the type of the object partially represented by the partial region Bj for each partial region Bj (hereinafter, the specified type of the object is also referred to as "object type").

A flowchart in a middle part of FIG. 13 illustrates an example of processing that specifies the object type in one partial region Bj (hereinafter, also referred to as "target partial region Bj"). In S400, the processor 110 determines whether or not the target partial region Bj is a blank region. When all the pixel values of the plurality of pixels included in the target partial region Bj are each a pixel value falling within a predetermined color range representing a background (e.g., pixel value within a predetermined color range including white), a result of the determination becomes affirmative (YES). When the determination result is affirmative (S400: YES), the processor 110 specifies in S410 that the object type of the target partial region Bj is "blank." Hereinafter, the target partial region Bj specified as "blank" is also referred to as "blank region."

When the target partial region Bj includes a pixel representing a color different from the background (S400: NO), the processor 110 calculates, in 5420, an edge amount of each of the plurality of pixels in the target partial region Bj and then calculates an average edge amount Ed. Specifically, for calculation of the edge amount of one pixel, a brightness value is calculated from the pixel value (RGB value), and a known Sobel filter is applied to the brightness value. In place of the Sobel filter, various edge extraction filters such as a Prewitt filter and a Roberts filter may be used. Further, the edge extraction filter may be applied to a color component (e.g., gradation value of green G) other than the brightness value.

In S430, the processor 110 determines whether or not the average edge amount Ed is more than a predetermined threshold Te. When the target partial region Bj represents a part of the character, the average edge amount Ed becomes larger, because of a particular shape of the character, than in a case where the target partial region Bj represents a part of an object of a type different from the character. Thus, when the average edge amount Ed is more than the predetermined threshold Te (S430: YES), the processor 110 specifies in S440 that the object type of the target partial region Bj is "character." Hereinafter, the target partial region Bj specified as "character" is also referred to as "character region."

When the average edge amount Ed is equal to or less than the threshold Te (S430: NO), the processor 110 specifies in S450 that the object type of the target partial region Bj is a type other than the character. Hereinafter, the type other than character is also referred to as "non-character," and the target partial region Bj specified as "non-character" is also referred to as "non-character region."

The processor 110 executes the processing of specifying the object type for all the partial regions Bj constituting the target band image. Then, S305 of FIG. 11 is ended. In the example of FIG. 13, the object type of the plurality of partial regions Bj constituting regions AjT representing the objects OB3 (character strings) is "character," the object type of the plurality of partial regions Bj constituting a region AjN representing the object OB2 (photograph) is "non-character," and the object type of the plurality of partial regions Bj included neither in the regions AjT nor in the region AjN is "blank."

After completion of S305 of FIG. 11, the processor 110 advances to S310. In S315 after S310, the processor 110 determines whether or not the target block is a blank block. In the present embodiment, when all the partial regions Bj constituting the target block are the blank region, the processor 110 determines that the target block is the blank block. When determining that the target block is the blank block (S315: YES), the processor 110 advances to S360 without calculating the estimate value EV of the target block and determines whether or not all the blocks in the target band image have been processed. When determining that there is any unprocessed block (S360: NO), the processor 110 returns to S310 and executes the processing for the unprocessed block. This can reduce time required for the processing of determining the ejection execution direction. When determining that the target block includes any partial region Bj (in this case, at least one of "character region" and "non-character region") that is not the blank (S315: NO), the processor 110 advances to S320. Then, in S325 or S330, the processor 110 calculates the estimate value EV.

After calculation of the estimate value EV (S325 or S330), the processor 110 determines in S335 whether or not the target block includes the non-character region. When determining that the target block includes the non-character region (S335: YES), the processor 110 specifies in S340 that the type of the object partially represented by the target block is "non-character," selects a predetermined threshold Thn for non-character, and advances to S350a.

When determining that the target block does not include the non-character region (S335: NO), the processor 110 specifies in S345 that the type of the object partially represented by the target block is "character," selects a predetermined threshold Tht for character, and advances to S350a.

In S350a, the processor 110 determines whether or not the estimate value EV is equal to or more than the threshold selected in S340 or S345. When a result of the determination in S350a is affirmative (YES), the processor 110 advances to S355. When a result of the determination in S350a is negative (NO), the processor 110 advances to S360. The processing of other steps are the same as the processing of corresponding steps in FIG. 8.

FIG. 14A is a view schematically illustrating calculation expressions of the respective estimate values F1 and F2 and the thresholds Tht and Thn in the second embodiment. The calculation expressions of the respective estimate values F1 and F2 are the same as those in the first embodiment (FIG. 6C). Unlike the first embodiment illustrated in FIG. 6C, in the second embodiment, the estimate value EV calculated using the estimate value F1 or F2 is compared with the threshold Tht for character when the object type of the block BL is "character," while compared with the threshold Thn for non-character when the object type thereof is "non-character." In the second embodiment, the threshold Thn for non-character is less than the threshold Tht for character. Thus, the determination result in S350a is more likely to be affirmative (YES) when the target block does not represent the character than when the target block represents a part of the character.

An example of a determination result of the ejection execution direction is illustrated in a lower part of FIG. 13. A hatched character region AbT in the lower part of FIG. 13 is constituted by a plurality of blocks BL whose object type has been specified as character. The threshold Tht for character is applied to the blocks BL constituting the character range AbT. A hatched character region AbN is constituted by a plurality of blocks BL whose object type has been specified as non-character. The threshold Thn for non-character is applied to the blocks BL constituting the non-character range AbN. The blocks included neither in the character region AbT nor in the non-character region AbN are each the blank block.

The band image BI(n+3) includes a block BL11 representing a part of the object OB2 (photograph), i.e., a non-character block BL11. In the example of FIG. 13, the estimate value EV of the block BL11 is more than the threshold Thn for non-character which is less than the threshold Tht for character (S350a: YES). Thus, the forward direction D1 is determined as the direction of the ejection processing for the band image BI(n+3) (S355).

The band image BI(n+4) includes a block BL12 representing a part of the object OB2 (photograph), i.e., a non-character block BL12. In the example of FIG. 13, the estimate value EV of the block BL12 is more than the threshold Thn for non-character which is less than the threshold Tht for character (S350a: YES). Thus, the forward direction D1 is determined as the direction of the ejection processing for the band image BI(n+4) (S355).

As described above, in the example of FIG. 13, the forward direction D1 is determined as the direction of the ejection processing for the two band images BI(n+3) and BI(n+4) representing the object OB2 (photograph). Thus, recognizability of the color gap caused due to the difference in the ink overlapping order can be reduced in the region representing the object OB2 (photograph).

As described above, in the second embodiment, the threshold for a block BL is selected depending on the type of the object partially represented by the block BL, so that the direction of the ejection processing can be determined considering the object type. Specifically, when the object type of the target block has been specified as non-character (S335: YES), determination using the estimate value EV of the target block is made under a condition that a predetermined direction (forward direction D1) is more likely to be selected than when the object type of the target block has been specified as character (S335: NO) (that is, a condition that the threshold Thn which is a comparatively small is used) (S340, S350a). This can reduce recognizability of the color gap caused due to the difference in the ink overlapping order in the region representing the object of a type different from the character. Further, when the object type of the target block has been specified as character (S335: NO), that is, when the target block does not represent the object of a type different from the character but represents the character, determination using the estimate value EV of the target block is made under a condition that a direction opposite to the direction of the previous ejection processing is more likely to be selected (that is, a condition that the threshold Tht which is a comparatively large is used) (S345, S350a). This can increase printing speed when the color gap caused due to the ink overlapping order is not recognizable as when the character string is printed.

C. Modifications (1) A condition (also referred to as "direction condition") for determining, as the direction of the ejection processing for the target band image, the forward direction D1 irrespective of the direction of the previous ejection processing is not limited to the condition of FIG. 8 that "the estimate value EV of at least one block BL is equal to or more than the predetermined threshold Th" and the condition of FIG. 11 "the estimate value EV of at least one block BL is equal to or more than the threshold determined depending on the object type," but other various conditions may be adopted.

For example, a condition illustrated in FIG. 14B may be adopted. In an embodiment of FIG. 14B, calculation expressions of respective estimate values F1w and F2w differ from the calculation expressions of FIG. 6C. Specifically, the estimate values F1w and F2w of FIG. 14B are weighted estimate values obtained by multiplying the estimate values F1 and F2 of FIG. 6C by an object weight ($\epsilon t$ or $\epsilon n$). When the object type of the target block is "character," a predetermined weight $\epsilon t$ for character is used; on the other hand, when the object type of the target block is "non-character," a predetermined weight $\epsilon n$ for non-character is used. The weight $\epsilon t$ for character is smaller than the weight $\epsilon n$ for non-character. The tables 134 and 136 (FIG. 1) are the same as the tables 134 and 136 of the first embodiment and represent the estimate values F1 and F2 with no object weight of FIG. 6C, respectively. When calculating the estimate value of the target block, the processor 110 calculates the estimate values F1 and F2 from the pixel values and the tables 134 and 136 and multiplies the estimate values F1 and F2 by the weight associated with the object type of the target block, thereby calculating the weighted estimate values F1w and F2w. Then, the processor 110 uses the weighted estimate values F1w and F2w to calculate the estimate value EV. The calculated estimate value EV is compared with the predetermined threshold Th as in the first embodiment. Since the weight $\epsilon n$ for non-character is larger than the weight $\epsilon t$ for character, recognizability of the color gap caused due to the difference in the ink overlapping order can be reduced in the region representing the object of a type different from the character, as in the second embodiment of FIG. 11. Further, printing speed can be increased when the color gap caused due to the ink overlapping order is not recognizable as when the character string is printed. In place of the tables 134 and 136 representing the estimate values F1 and F2 with no object weight, tables representing the weighted estimate values F1w and F2w may be used.

In addition, as the condition for determining, as the direction of the target ejection processing, the forward direction D1 irrespective of the direction of the previous ejection processing, a condition "a percentage of the number of blocks BL that have the estimate value EV equal to or more than the threshold relative to the total number of blocks BL that constitute the target band image is equal to or more than a predetermined percentage threshold" may be adopted. As the threshold, a common threshold Th may be adopted irrespective of the object type, or one of thresholds Tht and Thn may be selectively used depending on the object type. As a calculation method for the estimate value EV, a method that uses the non-weighted estimate values F1 and F2 may be adopted, or a method that uses the weighted estimate values F1w and F2w may be adopted.

Generally, as the direction condition for adopting the forward direction D1 irrespective of the direction of the previous ejection processing, a condition satisfied when the color gap represented by the estimate value EV of one or more blocks BL is large (that is, when the color gap is recognizable) is preferably adopted. With this configuration, recognizability of the color gap can be reduced. When such a condition is not satisfied, a direction opposite to the direction of the previous ejection processing is preferably adopted. With this configuration, printing speed can be increased. The direction condition may be determined using a condition (also referred to as "estimate value condition") represented by using the estimate value EV and related to one block BL. For example, as the estimate value condition, a condition representing that the color gap is comparatively large, more specifically, a condition representing that the color gap is equal to or more than a reference value may be adopted. For example, the estimate value representing that the color gap is equal to or more than a reference value, a condition that the estimate value EV of the block BL is equal to or more than a threshold may be adopted. As the direction condition, various conditions including a condition that the estimate value condition is satisfied by at least one block BL may be adopted. As the forward direction D1, any predetermined one of two directions along the main scanning direction may be adopted. Further, in place of the above conditions, other conditions may be adopted.

(2) The calculation expressions of the estimate values F1, F2, F1w, and F2w are not limited to the calculation expressions in the above respective embodiments, but other various calculation expressions may be adopted. For example, as the color difference dM, in place of the distance in the CIELAB color space, a distance in another color space may be adopted. For example, a distance in a CIELUV color space may be adopted. Generally, as a color space for use in specifying the color difference dM, a uniform color space which is a color space where the Euclidean distance between two colors represents the color gap perceived by an observer who observes the two colors is preferably adopted. As the color difference dM, the Euclidean distance in the uniform color space is preferably adopted. With this configuration, the direction of the ejection processing can be determined using an adequate color difference dM between various colors. However, the color difference dM may be calculated using a color space (e.g., RGB color space) other than the uniform color space.

Further, a correspondence between the pixel value and each of the estimate values F1, F2, F1w, and F2w may be determined not with the color difference dM calculated from the colorimetric value but with the perceptual gaps dC1 and dC2. For example, the perceptual gaps dC1 and dC2 themselves may each be adopted as the estimate value. Further, conversely, a correspondence between the pixel value and each of the estimate values F1, F2, F1w, and F2w may be determined not with the perceptual gaps dC1 and dC2 but with the color difference dM calculated from the colorimetric value. For example, in place of the weights $\gamma 1$ and $\gamma 2$, a predetermined coefficient $\gamma 1c$ for proximity estimate value F1 and a predetermined coefficient $\gamma 2c$ for separation estimate value F2 may be used $\gamma 1c > \gamma 2c$).

In either case, as the information representing a correspondence between the pixel value and the estimate value, in place of the lookup table, information in any other format may be adopted. For example, a function representing the pixel value and the estimate value may be adopted.

(3) The pixel for use in specifying the estimate value EV of the block BL may be some of the plurality of pixels constituting the block BL. For example, a plurality of pixels (e.g., a plurality of pixels selected alternately) evenly selected from all the pixels constituting the block BL may be used. Generally, the estimate value EV of the block BL is preferably specified using the pixel values of one or more pixels constituting the block BL.

Further, as the estimate value EV of the block BL, various values determined in accordance with the pixel values of one or more pixels constituting the block BL may be adopted. For example, in place of the average value of the estimate values (e.g., estimate values F1, F2, F1w, or F2w) of one or more pixels constituting the block BL, any one of a maximum, a median, a mode, and a minimum may be used. Further, an estimate value (e.g., estimate values F1, F2, F1w, or F2w) associated with one pixel value obtained by integrating the pixel values of one or more pixels constituting the block BL may be used as the estimate value EV of the block BL. For example, as a method of integrating the plurality of pixel values so as to specify one pixel value, a method using any one of the average value, maximum, median, mode, and minimum of the plurality of pixel values may be adopted. The average value or the like is calculated for each color component. An integrated value of a plurality of estimate values (e.g., estimate values F1, F2, F1w, or F2w) obtained from the plurality of pixels constituting the block BL may be used as the estimate value EV of the block BL. Generally, as the estimate value EV of the block BL, a value having correlation with the gap (specifically, the color gap caused due to the difference in the ink overlapping order) of the color represented by the pixel value of at least one pixel of the plurality of pixels constituting the block BL is preferably adopted.

(4) As a method of changing the estimate value condition represented using the estimate value EV of the target block depending on the object type, various methods may be adopted. For example, as in the embodiment of FIG. 11, the threshold (Tht or Thn) for determining a magnitude of the estimate value EV may be determined depending on the object type. Further, as in the embodiment of FIG. 14B, as the estimate values F1w and F2w of each pixel for use in calculating the estimate value EV, a value weighted by a weight ($\epsilon$t or $\epsilon$n) selected depending on the object type may be calculated.

Generally, in determination of the direction of the ejection processing, when the object type of the block BL is a first type, the processor 110 determines whether or not a first condition represented by using the estimate value EV of the block BL is satisfied; on the other hand, when the object type of the block BL is a second type, the processor 110 determines whether or not a second condition represented by using the estimate value EV of the block BL is satisfied. The first type is a type in which the color gap caused due to the difference in the ink overlapping order is less recognizable than the second type. The first type is not limited to character but may include other types (e.g., line drawing). The second type is not limited to all types different from the first type, but may include various specific types (e.g., photograph) different from the first type. As the first and second conditions, a condition representing that the color gap represented by the estimate value EV is large may be adopted. The first condition is a condition that the color gap is determined to be smaller than in the second condition, that is, a condition that a direction opposite to the direction of the previous ejection processing is likely to be determined as the direction of the ejection processing. When a value weighted by a weight selected depending on the object type is used as the estimate value EV as in the modification of FIG. 14B, it can be described that the condition differs depending on the object type even when the determination is made using the estimate value EV and the common threshold Th. Specifically, it can be described that a criterion for determining a magnitude of the difference between an image color printed by the ejection processing in the forward direction D1 and an image color printed by the ejection processing in the backward direction D2 differs depending on the object type. As the direction condition for adopting the forward direction D1 irrespective of the direction of the previous ejection processing, various conditions including a condition that an estimate value condition (e.g., the first condition or the second condition) associated, by at least one block BL, with the object type of the one block BL is satisfied may be adopted. For the first and second conditions, in place of the condition that they have different thresholds (Tht, Thn) or different weights ($\epsilon$t, $\epsilon$n), other various conditions may be adopted.

(5) As a method of specifying the object type of the block BL, in place of the methods described in FIGS. 11 and 13, other various methods may be adopted. For example, the object type may be specified by combining various parameters such as dispersion of specific color components in the block BL and total number of colors used in the block BL.

(6) As the processing of determining the direction of the ejection processing, in place of the processing described in the above respective embodiments and modification, other various processing may be adopted. For example, in FIG. 11, the processor 110 directly advances from S310 to S320 by skipping S315.

(7) As the configuration of the head moving unit 294, in place of the configuration of the above embodiments, any other configuration that can reciprocate the print head 292 in the main scanning direction may be adopted. As the configuration of the conveying unit 296, in place of the configuration of the above embodiments, any other configuration that can convey the sheet PM in the sub-scanning direction may be adopted. A total number of inks (more commonly, color materials) that the print execution unit 290 can use may be any number equal to or more than two. For example, a black ink may be used in addition to the inks of the cyan C, magenta M, and yellow Y. The print head 292 is preferably provided with the nozzle groups as much as the total number of the inks that can be used. That is, the print head 292 is preferably provided with L (L is an integer equal to or more than two) nozzle groups, and the L nozzle groups preferably eject color materials of L different colors. With this configuration, the print head 292 is provided with a necessary minimum number of nozzle groups, thereby simplifying the configuration of the print head 292. In such a configuration, two nozzle groups arbitrarily selected from the plurality of nozzle groups of the print head 292 eject inks of different colors.

(8) The tables 134 and 136 described in FIG. 5 may be created not by a manufacturer of the multifunction peripheral 200 but according to an instruction from a user. For example, the following configuration may be adopted: the multifunction peripheral 200 executes S100, S120, S140, and S150 of FIG. 5 according to an instruction from the user, a spectral colorimeter not illustrated executes S110 according to an instruction from the user, and the user executes S130. The creation of the tables 134 and 136 according to an instruction from the user may be made after shipping of the multifunction peripheral 200.

(9) In place of the image processing apparatus 100, the processor 210 of the multifunction peripheral 200 may execute the print processing of FIG. 7 according to the program 232. In this case, the processor 210 of the multifunction peripheral 200 operates as the image processing apparatus. Further, the control unit 298 of the print execution unit 290 may execute a part of the processing (e.g., S230 and S220) of FIG. 7. The control unit 298 of the print execution unit 290 may be omitted. In this case, the image processing apparatus directly controls the print execution unit 290. In either case, data including image data representing the target image and information representing the direction of the ejection processing determined in S210 may be adopted as the print data for controlling the print execution unit 290.

(10) The image processing apparatus 100 of FIG. 1 may be a device (a digital camera, a scanner, etc.) of a type different from a personal computer. Further, a device including the print execution unit may be a device (a printer, etc.) of a type different from the multifunction peripheral 200. Further, the image processing apparatus may be integrated into a device including the print execution unit. Further, a plurality of devices (computers, etc.) that can communicate with one another through a network each shares a part of image processing function of the image processing apparatus to realize, as a whole, the image processing function (in this case, a system provided with the devices corresponds to the image processing apparatus).

A part of the configuration realized by hardware in the above respective embodiments may be replaced by software; on the contrary, a part of or the entire configuration realized by software may be replaced by hardware. For example, functions of S220, S230, and S240 of FIG. 7 may be realized by a dedicated hardware circuit.

Further, in a case where a part of or the entire function of the present disclosure is realized by a computer program, the computer program can be provided in a form stored on a computer-readable recording medium (e.g., non-temporary storage medium). The program can be used in a state stored in the same recording medium as that used when provided or different recording medium. The "computer-readable recording medium" is not limited to a portable recording medium such as a memory card or a CD-ROM, but includes an internal storage device, installed in a computer, such as various ROMs, and an external storage device, connected to the computer, such as a hard disk.

While the description has been made in detail with reference to specific embodiments thereof, the embodiments have been described for easy understanding to the present disclosure, but it would be apparent to those skilled in the art that various changes and modifications may be made therein without departing from the spirit and scope of the above described embodiments.

What is claimed is:

1. An image processing apparatus for controlling a print execution unit, wherein the print execution unit includes:
   a print head having a plurality of nozzle groups corresponding to a plurality of color material and arranged in a main scanning direction, each of the plurality of nozzle groups comprising a plurality of nozzles arranged in a sub-scanning direction, each of the plurality of nozzles being configured to eject a droplet of color material onto a printing medium,
   the image processing apparatus comprising a controller configured to perform:
   acquiring image data;
   determining an ejection execution direction of the print head for each of a plurality of pieces of band image data, the image data including the plurality of pieces of band image data representing a plurality of band images arranged in the sub-scanning direction, the ejection execution direction being one of a first direction and a second direction, the first direction being parallel to the main scanning direction, the second direction being parallel to the main scanning direction and opposite to the first direction; and
   controlling the print execution unit to form an image according to the image data, the print execution unit repeatedly performing an ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed,
   wherein the controller is further configured to perform:
   specifying an estimate value for a target partial image by using color gap information, the target partial image being selected among a plurality of partial images included in the N-th band image, the color gap information including adjacent-state color gap information and separate-state color gap information, the adjacent-state color gap information being relevant to a color gap perceived when a first printed image and a second printed image are disposed adjacent to each other, the first printed image having a pixel value and being printed by moving the print head in the first direction, the second printed image having the pixel value same as the first printed image and being printed by moving the print head in the second direction, the separate-state color gap information being relevant to a color gap perceived when the first printed image and the second printed image are separated from each other, the adjacent-state color gap information being used in response to determining that the target partial image is adjacent to another band image different from the N-th band image, the separate-state color gap information being used in response to determining that the target partial image is not adjacent to another band image different from the N-th band image;
   determining whether the estimate value satisfies an estimate condition, the estimate condition indicating that a color gap between the first printed image and the second printed image is recognizable;
   determining the ejection execution direction with respect to the N-th ejection processing to be the first direction in response to determining that the estimate value satisfies the estimate condition; and
   determining the ejection execution direction with respect to the N-th ejection processing to be opposite to the ejection execution direction with respect to the (N−1)-th ejection processing in response to determining that the estimate value does not satisfy the estimate condition, where N is an integer equal to or greater than 2.

2. The image processing apparatus according to claim 1, wherein the estimate condition includes that a color gap represented by the estimate value is equal to or more than a reference value; and
   wherein the estimate value corresponding to the target partial image is one of an adjacent-state estimate value calculated by using the adjacent-state color gap information and a separate-state estimate value calculated by using the separate-state color gap information.

3. The image processing apparatus according to claim 1, wherein the color gap associated with some pixel values according to the adjacent-state color gap information is more recognizable than the color gap associated with some pixel values according to the separate-state color gap information.

4. The image processing apparatus according to claim 3, wherein the color gap according to the adjacent-state color gap information is more recognizable as a gap perceived by an observer who visually observes a first color image and a second color image disposed adjacent to the first color image is larger; and
    wherein the color gap according to the separate-state color gap information is more recognizable as a gap perceived by an observer who visually observes the first color image and the second color image disposed separately from the first color image is larger.

5. The image processing apparatus according to claim 4, wherein a difference between a color gap associated with a first pixel value in the adjacent-state color gap information and a color gap associated with the first pixel value in the separate-state color gap information is larger than a difference between a color gap associated with a second pixel value in the adjacent-state color gap information and a color gap associated with the second pixel value in the separate-state color gap information.

6. The image processing apparatus according to claim 5, wherein the first pixel value is a pixel value included in one of a color range between red and white and a color range between yellow and black of a first color space, and the second pixel value is a pixel value included in one of a color range between blue and black and a color range between blue and green of the first color space.

7. The image processing apparatus according to claim 3, wherein the adjacent-state color gap information and the separate-state color gap information each relates to a first colorimetric value of a first color of a first color image and a second colorimetric value of a second color of a second color image; and
    wherein a color gap according to the adjacent-state color gap information and a color gap according to the separate-state color gap information are more recognizable as a distance between the first colorimetric value and the second colorimetric value in a second color space is larger.

8. The image processing apparatus according to claim 7, wherein a distance for a color printed with a combination of two color materials is larger than a distance for a color printed with one color material.

9. The image processing apparatus according to claim 1, wherein the target partial image represents a part of an object; and
    wherein the controller is further configured to perform:
        specifying an object type of the object among a plurality of object types including a first object type and a second object type;
        determining whether the estimate value satisfies a first estimate condition when the first object type is specified; and
        determining whether the estimate value satisfies a second estimate condition when the second object type is specified.

10. The image processing apparatus according to claim 9, wherein the first object type represents a character, and the second object type represents an object type different from the character.

11. The image processing apparatus according to claim 1, wherein in the print head, the plurality of nozzle groups includes a first nozzle group having a plurality of first nozzles and a second nozzle group having a plurality of second nozzles;
    wherein in the ejection processing in the first direction, when the print head is moved in the first direction, the plurality of first nozzles ejects a droplet of first color material onto the print medium and the plurality of second nozzles successively ejects a droplet of second color material onto the print medium; and
    wherein in the ejection processing in the second direction, when the print head is moved in the second direction, the plurality of second nozzles ejects a droplet of second color material onto the print medium and the plurality of first nozzles successively ejects a droplet of first color material onto the print medium.

12. The image processing apparatus according to claim 1, wherein in the print head, the plurality of nozzle groups includes L nozzle groups and each of the L nozzle groups ejects a droplet of color material different from each other, where L is an integer equal to or greater than 2.

13. A non-transitory computer readable storage medium storing a set of program instructions installed on and executed by a controller, the program instructions, when executed by the controller, causing the controller to control a print execution unit to perform image forming, the print execution unit including a print head having a plurality of nozzle groups corresponding to a plurality of color material and arranged in a main scanning direction, each of the plurality of nozzle groups comprising a plurality of nozzles arranged in a sub-scanning direction, each of the plurality of nozzles being configured to eject a droplet of color material onto a printing medium, the controller being configured to control an image processing apparatus to perform:
    acquiring image data;
    determining an ejection execution direction of the print head for each of a plurality of pieces of band image data, the image data including the plurality of pieces of band image data representing a plurality of band images arranged in the sub-scanning direction, the ejection execution direction being one of a first direction and a second direction, the first direction being parallel to the main scanning direction, the second direction being parallel to the main scanning direction and opposite to the first direction; and
    controlling the print execution unit to form an image according to the image data, the print execution unit repeatedly performing an ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed,
    wherein the program instructions further comprise controlling the image processing apparatus to perform:
        specifying an estimate value for a target partial image by using color gap information, the target partial image being selected among a plurality of partial images included in the N-th band image, the color gap information including adjacent-state color gap information and separate-state color gap information, the adjacent-state color gap information being relevant to a color gap perceived when a first printed image and a second printed image are disposed adjacent to each other, the first printed image having a pixel value and being printed by moving the print head in the first direction, the second printed image having the pixel value same as the first printed image and being printed by moving the print head in the second direction, the separate-state color gap information being relevant to a color gap perceived when the first printed image and the second printed image are separated from each other, the adjacent-state color gap information being used in response to determining that the target partial image is adjacent to another band image different from the N-th band image, the separate-state color gap information being used in response to determining that the target partial image is not adjacent to another band image different from the N-th band image;

determining whether the estimate value satisfies an estimate condition, the estimate condition indicating that a color gap between the first printed image and the second printed image is recognizable;

determining the ejection execution direction with respect to the N-th ejection processing to be the first direction in response to determining that the estimate value satisfies the estimate condition; and determining the ejection execution direction with respect to the N-th ejection processing to be opposite to the ejection execution direction with respect to the (N−1)-th ejection processing in response to determining that the estimate value does not satisfy the estimate condition, where N is an integer equal to or greater than 2.

* * * * *